(12) United States Patent
Nakamura et al.

(10) Patent No.: US 8,998,785 B2
(45) Date of Patent: Apr. 7, 2015

(54) MACHINE TOOL INCLUDING TOOL RADIUS ADJUSTING DEVICE

(75) Inventors: Eiji Nakamura, Nagoya (JP); Akihiko Kadota, Chiryu (JP); Takashi Yokoyama, Seto (JP)

(73) Assignee: JTEKT Corporation, Osaka-shi (JP)

( * ) Notice: Subject to any disclaimer, the term of this patent is extended or adjusted under 35 U.S.C. 154(b) by 881 days.

(21) Appl. No.: 13/217,555

(22) Filed: Aug. 25, 2011

(65) Prior Publication Data

US 2012/0058871 A1    Mar. 8, 2012

(30) Foreign Application Priority Data

Sep. 6, 2010  (JP) ................................. 2010-199116

(51) Int. Cl.
*B23Q 3/157* (2006.01)
*B23B 29/034* (2006.01)

(52) U.S. Cl.
CPC .......... *B23Q 3/15713* (2013.01); *B23Q 3/1574* (2013.01); *B23B 29/03432* (2013.01); *B23B 29/03421* (2013.01); *B23B 29/03425* (2013.01)

(58) Field of Classification Search
USPC ............................ 483/4, 7, 10, 11, 13, 31, 32
See application file for complete search history.

(56) References Cited

U.S. PATENT DOCUMENTS

| 3,595,131 | A | | 7/1971 | Rozanek |
| 4,400,118 | A | | 8/1983 | Yamakage et al. |
| 4,473,937 | A | | 10/1984 | Ortlieb |
| 4,484,481 | A | * | 11/1984 | Laird et al. ................. 73/863.12 |
| 4,489,629 | A | * | 12/1984 | D'Andrea et al. ................ 82/1.2 |
| 4,648,757 | A | * | 3/1987 | Plummer ........................ 408/12 |
| 6,312,200 | B1 | * | 11/2001 | Graham et al. ............... 408/1 R |
| 7,140,819 | B2 | * | 11/2006 | Broghammer et al. ....... 409/234 |
| 2011/0116880 | A1 | | 5/2011 | Nakamura et al. |

FOREIGN PATENT DOCUMENTS

| EP | 155241 A | * | 9/1985 |
| GB | 2 040 742 A | | 9/1980 |
| JP | 43-9181 B | | 4/1968 |
| JP | 59014404 A | * | 1/1984 |

(Continued)

OTHER PUBLICATIONS

Extended European Search Report issued Oct. 5, 2012 in Patent Application No. 11179814.6.

(Continued)

*Primary Examiner* — Erica E Cadugan
*Assistant Examiner* — Michael Vitale
(74) *Attorney, Agent, or Firm* — Oblon, McClelland, Maier & Neustadt, L.L.P.

(57) ABSTRACT

A tool radius adjusting device executes an operation for adjusting the tool radius of a boring holder in parallel with execution of a machining program for executing an operation of a spindle head and an operation of a tool changer. A carrier control unit determines whether the tool changer is executing a tool changing process. When the tool changing process is not being executed, the carrier control unit allows the carrier device to execute an operation for picking the boring holder out from the tool magazine and an operation for returning the boring holder, of which the tool radius has been adjusted, to the tool magazine.

4 Claims, 16 Drawing Sheets

(56) References Cited

FOREIGN PATENT DOCUMENTS

| | | |
|---|---|---|
| JP | 61-78505 U | 5/1986 |
| JP | 2001-259970 A | 9/2001 |
| JP | 2003-311517 | 11/2003 |
| JP | 2005-288635 A | 10/2005 |
| JP | 2007-283469 | 11/2007 |
| WO | WO 97/32680 A1 | 9/1997 |
| WO | WO 2011/058989 A1 | 5/2011 |

OTHER PUBLICATIONS

Partial English language translation of the Office Action issued May 27, 2014 in Japanese Patent Application No. 2010-199116.
Office Action issued Apr. 15, 2014 in Japanese Patent Application No. 2010-199116 (submitting partial English language translation only).
English translated Chinese Office Action dated Jan. 6, 2015 in Chinese Patent Application No. 201110264337X.

* cited by examiner

MACHINE TOOL INCLUDING TOOL RADIUS ADJUSTING DEVICE

INCORPORATION BY REFERENCE

This application claims priority to Japanese Patent Application No. 2010-199116 filed on Sep. 6, 2010 the disclosure of which, including the specification, drawings and abstract, is incorporated herein by reference in its entirety.

BACKGROUND OF THE INVENTION

1. Field of the Invention

The invention relates to a machine tool that includes a tool radius adjusting device that adjusts a tool radius of a boring holder, the tool radius being adjustable.

2. Description of Related Art

For example, Japanese Patent Application Publication No. 2007-283469 (JP 2007-283469 A) describes a conventional boring holder that has an adjustable tool radius. The tool radius of the boring holder is adjusted with the boring holder fitted to a tool spindle of a machine tool, for example, a machining center.

However, if the tool radius is adjusted with the boring holder fitted to the tool spindle of the machine tool, it is not possible to machine a workpiece during adjustment of the tool radius. Therefore, a time period over which machining is not executed becomes longer, resulting in a longer machining cycle time.

SUMMARY OF THE INVENTION

The invention is made in light of the above-described circumstances, and it is, therefore, an object of the invention to provide a machine tool that includes a tool radius adjusting device that is capable of adjusting a tool radius without exerting influence on a machining time period.

According to a feature of an example of the invention, in a tool magazine, a tool radius adjustment index position and a tool change index position are set to different positions. Further, a tool radius adjusting device is able to execute an operation for adjusting the tool radius of the boring holder in parallel with execution of a machining program for executing an operation of the spindle head and an operation of a tool changer. In addition, a carrier control unit determines whether a tool changing process is being executed by the tool changer, and allows a carrier device to execute an operation for picking the boring holder out from the tool magazine and an operation for returning the boring holder, of which the tool radius has been adjusted, to the tool magazine when the tool changing process is not being executed. Thus, it is possible to execute an operation of the tool radius adjusting device and an operation of the carrier device without exerting influence on a process of a machining program. Accordingly, it is possible to suppress an increase in a machining cycle time even if the tool radius of the boring holder is adjusted.

According to another feature of an example of the invention, when a duration of time before execution of a tool changing process is started is equal to or longer than a predetermined duration of time, the operation of the carrier device is executed. Accordingly, it is possible to suppress occurrence of the situation where the tool is changed by the tool changer while the carrier device is executing the operation for picking the boring holder out from the tool magazine or the operation for returning the boring holder, of which the tool radius has been adjusted, to the tool magazine. That is, it is possible to execute the operation of the carrier device without exerting influence on a tool changing operation executed by the tool changer. As a result, it is possible to suppress an increase in time for changing the tools, which will exert influence on the machining cycle time.

According to a further feature of an example of the invention, when the boring holder is arranged at the tool radius adjusting device, the tool axis direction of the boring holder coincides with the vertical direction. Thus, an operator is able to place a new boring holder in the tool magazine by arranging the new boring holder at the tool radius adjusting device and operating the carrier device. Especially, the mass of the boring holder having an adjustable tool radius may be heavy. Therefore, it is not easy to carry and fit the heavy boring holder such that the tool axis direction of the boring holder coincides with horizontal direction, in order to directly place the boring holder in the tool magazine. In contrast to this, even if the boring holder has a heavy mass, it is relatively easy to carry and fit the boring holder such that the tool axis direction of the boring holder coincides with the vertical direction. That is, it is possible to more easily place the heavy boring holder in the tool magazine if the boring holder is placed in the tool magazine via the tool radius adjusting device.

According to another feature of the invention, by way of example, the boring holder includes a coarse motion adjusting mechanism and a fine motion adjusting mechanism. Fine motion adjustment to the tool radius is made more accurately when the boring holder is fitted to the spindle head. On the other hand, when coarse motion adjustment to the tool radius is made, the boring holder need not be fitted to the spindle head. Therefore, it is possible to make a desired tool radius adjustment by picking the boring holder out from the tool magazine and making the coarse motion adjustment without exerting influence on the process of the machining program.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Construction of Boring Holder

Figure 1:
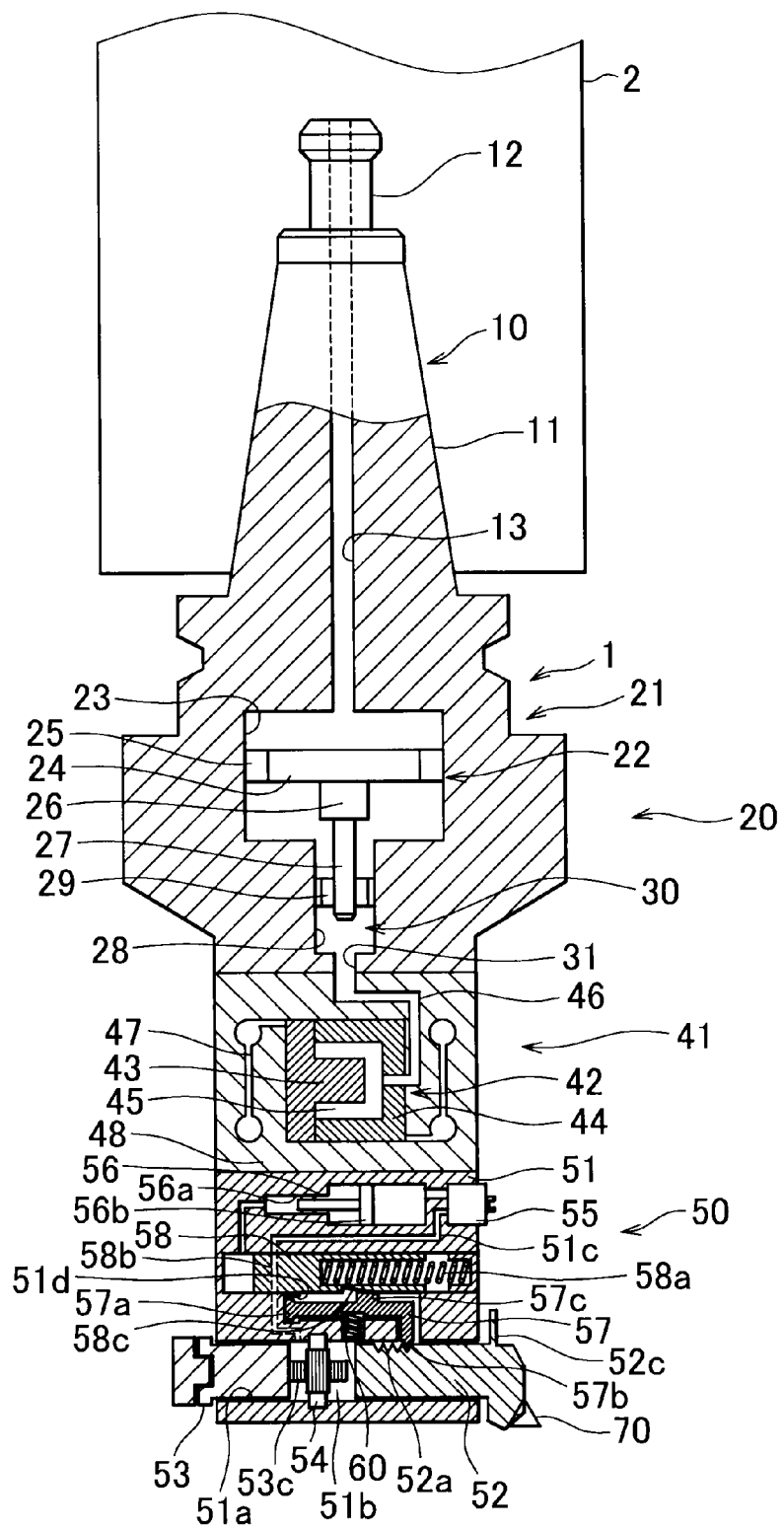
FIG. 1 is an axial partial sectional view of a boring holder.

The construction of a boring holder 1 in a first embodiment will be described with reference to FIGS. 1-3. As shown in FIG. 1, the boring holder 1 is a tool assembly which is held in a tool spindle 2 being rotatable about its axis for machining bores, recesses and the like in a workpiece, and is capable of adjusting its tool radius. In each of the figures, a tool spindle 2 side of the boring holder 1 will be referred to as base end or base end side, whereas a side with a cutting blade 70 thereon of the boring holder 1 will be referred to as distal end or distal end side.

The boring holder 1 is provided with a holder portion 10, a fine motion adjusting mechanism 20, a coarse motion adjusting mechanism 50, and the cutting blade 70. The holder portion 10, the fine motion adjusting mechanism 20 and the coarse motion adjusting mechanism 50 constitute a main body of the boring holder 1. The holder portion 10 is provided with a taper shank portion 11 formed to a taper shape which becomes narrower toward the base end, and a pull stud 12 provided at an extreme base end of the taper shank portion 11. The taper shank portion 11 is inserted into a taper hole of the tool spindle 2, and the pull stud 12 is grasped by a collet (not shown) in the tool spindle 2. In this manner, the holder portion 10 is held in the tool spindle 2. Further, an air flow passage 13 extending in the axial direction is formed at the center of the taper shank portion 11. Air is supplied from the tool spindle 2 side to the air flow passage 13. The pressure of the air supplied from the tool spindle 2 side is controlled by a fluid control device (not shown).

The fine motion adjusting mechanism 20 is a device which is attached on a distal end of the holder portion 10 and which is capable of finely adjusting the position of the cutting blade 70 from the axis, that is, the tool radius. The fine motion adjusting mechanism 20 is provided with a base end body portion 21 and an elastic deformation section 41.

The base end body portion 21 is bodily connected to a distal end of the holder portion 10 and is formed with an air-oil pressure transforming section 22 inside thereof The air-oil pressure transforming section 22 is constructed as follows. A first cylinder 23 is formed in communication with an end side of the air flow passage 13 in the holder portion 10. In the first cylinder 23, a first piston 24 is received to be reciprocatively slidable in the axial direction (the vertical direction as viewed in FIG. 1) through a sliding seal 25. Further, the first piston 24 is connected at a distal end side thereof with a second piston 27 through a connecting rod 26. In a small-diameter second cylinder 28 which is in communication with the distal end side of the first cylinder 23, the second piston 27 is received to be reciprocatively slidable in the axial direction through a sliding seal 29.

An operating oil chamber 30 which is filled with operating oil is formed on a distal end side of the second piston 27. When an air pressure acts on the first piston 24 through the air flow passage 13 in the holder portion 10, the first piston 24 is moved toward the distal end side, and at the same time, the second piston 27 is moved toward the distal end side, whereby the oil pressure in the operating oil chamber 30 is increased. In this way, the air-oil pressure transforming section 22 transforms the air pressure supplied from the air flow passage 13 of the holder portion 10 into the oil pressure and increases the same. A communication passage 31 is formed in communication with the distal end side of the operating oil chamber 30.

The elastic deformation section 41 is constructed on a distal end of the base end body portion 21 as follows. A power unit 42 is provided inside the elastic deformation section 41. The power unit 42 is formed with an oil pressure chamber 45 between a convex block 43 and a concave block 44. The oil pressure chamber 45 and the communication passage 31 of the base end body portion 21 are in communication with each other through an oil passage 46 which is formed in a main body of the elastic deformation section 41 and the concave block 44. Further, an S-shaped slit 47 is formed in the elastic deformation section 41. When an oil pressure acts in the oil pressure chamber 45, a fine motion portion 48 on the distal end of the elastic deformation section 41 is deformed elastically to be shifted toward the left as viewed in FIG. 1 relative to a based end on the based end body portions 21 side of the elastic deformation section 41.

The coarse motion adjusting mechanism 50 is a device which is attached to a distal end of the fine motion adjusting mechanism 20 and which is capable of roughly adjusting the position of the cutting blade 70 from the axis of the holder portion 11, that is, the tool radius. The adjustable amount of the tool radius by the coarse motion adjusting mechanism 50 is greater than that by the fine motion adjusting mechanism 20. The coarse motion adjusting mechanism 50 is provided with a coarse motion housing 51, a coarse motion movable body 52, a counterweight 53, a pinion shaft 54, a fluid receiving port 55, an air-oil pressure transforming section 56, a clamping member 57 and an urging force generating section 58.

The coarse motion housing 51 is attached to the fine motion portion 48 of the elastic deformation section 41 in the fine motion adjusting mechanism 20. That is, when the fine motion portion 48 of the elastic deformation section 41 is shifted in a radial direction, the coarse motion housing 51 is shifted in the radial direction together with the shift motion of the fine motion portion 48.

The coarse motion movable body 52 is formed to take the shape of a generally round pillar. The coarse motion movable body 52 may be formed to take a square or rectangular pillar shape without being limited to such a round pillar. The cutting blade 70 is fixedly provided at an end side (a radially outer side of the boring holder 1) of the coarse motion movable body 52. On an external surface of the coarse motion movable body 52, a plurality (four in this particular embodiment) of grooves 52a which extend in a direction perpendicular to the center axis direction of the round pillar are arranged in a juxtaposed relation in the center axis direction of the round pillar. As one example, FIG. 2 shows the coarse motion movable body 52 with four grooves 52a. The grooves 52a are not required to be formed over the whole circumference of the round pillar and suffice to be formed within a predetermined angular range. The coarse motion movable body 52 so formed is reciprocatively slidably inserted into one opening side (the right side as viewed in FIG. 1) of a round hole 51a which is formed at a distal end side of the coarse motion housing 51 and which passes through the same in a radial direction. The moving amount (the coarse motion adjusting amount) in the radial direction of the coarse motion movable body 52 relative to the coarse motion housing 51 is greater than the fine motion adjusting amount of the fine motion portion 48 in the elastic deformation section 41 of the fine motion adjusting mechanism 20.

Further, the coarse motion movable body 52 is arranged to orient the grooves 52a on the external surface thereof upward as viewed in FIG. 1 (i.e., toward the base end side of the boring holder 1) and not to rotate about its round pillar axis. Further, a movable body rack portion 52b is bodily formed at a round shape base end portion of a coarse motion movable body 52 and extends in the axial direction of the round pillar. The movable body rack portion 52b constitutes a part of a rack-and-pinion mechanism and is in meshing with the pinion shaft 54 referred to later. That is, when the pinion shaft 54 is rotated, the coarse motion movable body 52 is moved in the left-right direction as viewed in FIG. 1.

Further, the coarse motion movable body 52 is provided on its distal end side with a reference portion 52c which protrudes toward the base end side of the boring holder 1. An outer surface of the reference portion 52c which surface extends radially of the boring holder 1 is formed to be a flat surface which has a normal line extending radially of the boring holder 1. The reference portion 52c is always at a position where it is exposed to the outside of the coarse motion housing 51. The reference portion 52c is used in making a coarse adjustment and is a member which is brought into contact with a position adjusting reference member 83 provided on a coarse motion adjusting unit 80 referred to later.

The counterweight 53 is for absorbing an imbalance weight which is built by an eccentric movement of the coarse motion movable body 52. Specifically, the shape and position of the counterweight 53 is set to have an inertia moment which is equivalent to an inertial moment generated by the coarse motion movable body 52 and the cutting blade 70. In this particular embodiment, the counterweight 53 is formed to take a generally round pillar as a whole and has a mass which is approximately the same as the mass of the coarse motion movable body 52.

The counterweight 53 incorporates therein a mechanism capable of adjusting its inertia moment. Specifically, the counterweight 53 is provided with a weight main body 53a and an adjustable weight 53b. The adjustable weight 53b is provided movably by means of, e.g., a screw or the like relative to the weight main body 53a in the sliding direction of the counterweight 53. That is, where the inertia moment including the coarse motion movable body 52 and the cutting blade 70 is changed by, for example, the replacement of the cutting blade 70, the counterweight 53 is able to have an inertia moment equivalent thereto as a whole by adjusting the position of the adjustable weight 53b relative to the weight main body 53a. The counterweight 53 is not limited to the round pillar shape and may be formed to, for example, a square or rectangular pillar.

The counterweight 53 is reciprocatively slidably inserted into the other opening side (the left side as viewed in FIG. 1) of the round hole 51a which is formed to radially pass through the distal end side of the coarse motion housing 51. The counterweight 53 is non-rotatably held by the coarse motion housing 51 not to turn about the round pillar axis. An weight rack portion 53c is bodily formed at a base end portion of the round pillar counterweight 53 and extends in the round pillar axis. The weight rack portion 53c constitutes another part of the rack-and-pinion mechanism and is in meshing with the pinion shaft 54 referred to later. Thus, when the pinion shaft 45 is rotated, the counterweight 53 is moved in the left-right direction as viewed in FIG. 1.

The pinion shaft 54 is supported at almost an axial center portion of the round hole 51a which is formed to radially pass through the distal end side of the coarse motion housing 51 and is rotatable about an axis parallel to the rotational axis of the coarse motion housing 51. The pinion shaft 54 is in meshing with the movable body rack portion 52b and the weight rack portion 53c. When the pinion shaft 54 is rotated counterclockwise as viewed in FIG. 3, the movable body rack portion 52b is moved toward the right as viewed in FIG. 3, in other words, the coarse motion movable body 52 is moved radially outward, while the weight rack portion 53c is moved toward the left as viewed in FIG. 3, in other words, the counterweight 53 is moved radially outward in a direction opposite to the moving direction of the coarse motion movable body 52. On the contrary, when the pinion shaft 54 is rotated clockwise, the movable body rack portion 52b is moved toward the left as viewed in FIG. 3, in other words, the coarse motion movable body 52 is moved radially inward, while the weight rack portion 53c is moved toward the right as viewed in FIG. 3, in other words, the counterweight 53 is moved radially inward in a direction opposite to the moving direction of the coarse motion movable body 52. That is, the rotation of the pinion shaft 54 causes the coarse motion movable body 52 and the counterweight 53 to move synchronously in opposite directions.

The fluid receiving port 55 is provided at a part of the outer surface on the base end of the coarse motion housing 51. The port 55 is able to be coupled to the coarse motion adjusting unit 80 which is outside the boring holder 1, and is configured to be supplied with pressurized air supplied from the coarse motion adjusting unit 80. Further, the port 55 has a first port and a second port. The first port is a port to supply air to an air residence chamber 51b referred to later, whereas the second port is a port to supply air to an air-oil pressure transforming section 56 referred to later.

In the coarse motion housing 51, the air residence chamber 51b is formed between the base end (an end portion being inside radially of the boring holder 1) of the coarse motion movable body 52 and the base end (an end portion being inside radially of the boring holder 1) of the counterweight 53. Between the air residence chamber 51b and the first port of the fluid receiving port 55, there is formed an air flow passage 51c which makes both of them communicate with each other. Thus, the coarse motion movable body 52 and the counterweight 53 are operated by the pressurized air supplied from the coarse motion adjusting unit 80 to the air residence chamber 51b. Specifically, when the pressurized air in the air residence chamber 51b is raised by being supplied from the coarse motion adjusting unit 80, the coarse motion movable body 52 is moved radially outward, so that the cutting blade 70 is moved in a direction to go away from the rotational axis. Simultaneously and synchronously with the movement of the coarse motion movable body 52, the counterweight 53 is slidden radially outward. The air supplied to the air residence chamber 51b is discharged gradually with the lapse of time through a slight clearance formed between the round hole 51a of the coarse motion housing 51 and the coarse motion movable body 52 and also through a slight clearance between the round hole 51*a* and the counterweight 53.

The air-oil pressure transforming section 56 is formed inside the coarse motion housing 51 and transforms into an oil pressure the air pressure which is supplied from the coarse motion adjusting unit 80 referred to later through the second port of the fluid receiving port 55. The transforming section 56 has a stepped cylinder 56*a* formed to extend radially inside of the coarse motion housing 51 and a piston 56*b* received in the stepped cylinder 56*a* to be slidable radially reciprocatively. The piston 56*b* has a large-diameter disc portion and a small-diameter rod portion. In the stepped cylinder 56*a*, a chamber on the right side as viewed in FIG. 2 of the large-diameter disc portion is supplied with pressurized air from the fluid receiving port 55. In the stepped cylinder 56*a*, the other chamber on the left side as viewed in FIG. 2 of the small-diameter rod portion of the piston 56*b* constitutes an operating oil chamber. Thus, when the pressurized air supplied through the second port of the fluid receiving port 55 acts on the large-diameter disc portion of the piston 56*b*, the same is moved toward the left, whereby the oil pressure in the operating oil chamber is boosted. In this way, the air-oil pressure transforming section 56 operates to transform the pressurized air into the pressurized oil and boots the pressurized oil.

The clamping member 57 comprises an L-shaped lever and is supported in the coarse motion housing 51. The clamping member 57 clamps the position of the coarse motion movable member 52 relative to the coarse motion housing 51 by pressing a part of the external surface of the coarse motion movable member 52. Conversely, the clamping member 57 unclamps the position of the coarse motion movable member 52 relative to the coarse motion housing 51 by releasing the pressing on the part of the external surface of the coarse motion movable member 52. Thus, the clamping member 57 serves as a switching lever for switching the clamping and unclamping of the coarse motion movable member 52. The clamping member 57 only performs switching the clamping and unclamping of the coarse motion movable member 52, but does not act to perform the sliding operation of the coarse motion movable member 52. That is, the operation for switching the clamping and unclamping by the clamping member 57 is performed independently of the sliding operation of the coarse motion movable member 52.

The clamping member 57 is provided with a support portion 57*a* which is located on one end side thereof and substantially pivotably supported by a pivot support portion 51*d* formed in the coarse motion housing 51, and an engaging claw 57*b* (pressing portion) which is located on the other end side thereof and is pressed on the external surface of the coarse motion movable member 52 to be engaged with either one of the plurality of grooves 52*a*. Thus, through the pivot movement about the support portion 57*a*, the clamping member 57 is operated to be switched into either of a state that the claw 57*a* is engaged with one of the grooves 52*a* of the coarse motion movable member 52 (i.e., clamping state) and another state that the claw 57*a* is disengaged from either of the grooves 52*a* of the coarse motion movable member 52 (i.e., unclamping state). The clamping member 57 is urged by a first spring 60 arranged in the coarse motion housing 51 in a direction to disengage the claw 57*a* from the grooves 52*a* of the coarse motion movable member 52.

Further, an engaging protrusion portion 57*c* having a taper surface is formed on a base end (on the side of the urging force generating section 58 referred to later) of the clamping member 57. The engaging protrusion portion 57*c* is formed so that in the state shown in FIG. 2, the protruding amount on the right side is smaller than the protruding amount on the left side.

The urging force generating section 58 generates on the clamping member 57 an urging force which acts in a direction (clamping direction) in which the clamping member 57 clamps the coarse motion movable member 52. The generating section 58 is provided with a second spring 58*a* and an urging member 58*b*. The second spring 58*a* is supported at one end of a round hole 51*e* which is radially formed in the coarse motion housing 51 at almost the center in the rotational axis of the boring holder 1.

The urging member 58*b* is in contact with the other end of the second spring 58*a*. The urging member 58*b* takes the form of a generally bottomed cylinder, and the second spring 58*a* is in contact with a bottom surface of the urging member 58*b* to urge the same. An operating oil chamber 51*f* is formed on the side opposite to the second spring 58*a* of the urging member 58*b*. The chamber 51*f* receives operating oil which is supplied from the operating oil chamber (the chamber on the lift side as viewed in FIG. 2 of the small-diameter rod portion of the piston 56*b* in the stepped cylinder 56*a*) of the air-oil pressure transforming section 56 through a communication passage 51*g*. Thus, the urging force of the second spring 58*a* and the pressure of the operating oil which counter each other act on the urging member 58*b*, and the position of the same in the sliding direction is determined in dependence on both of them.

Figure 2:
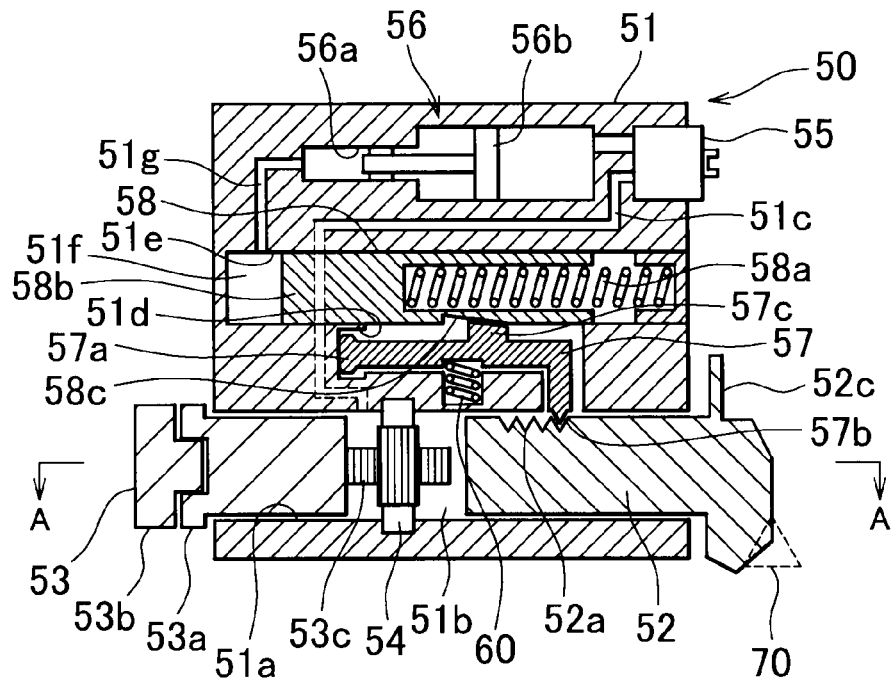
FIG. 2 is an axial enlarged sectional view of a coarse motion adjusting mechanism.
Figure 3:
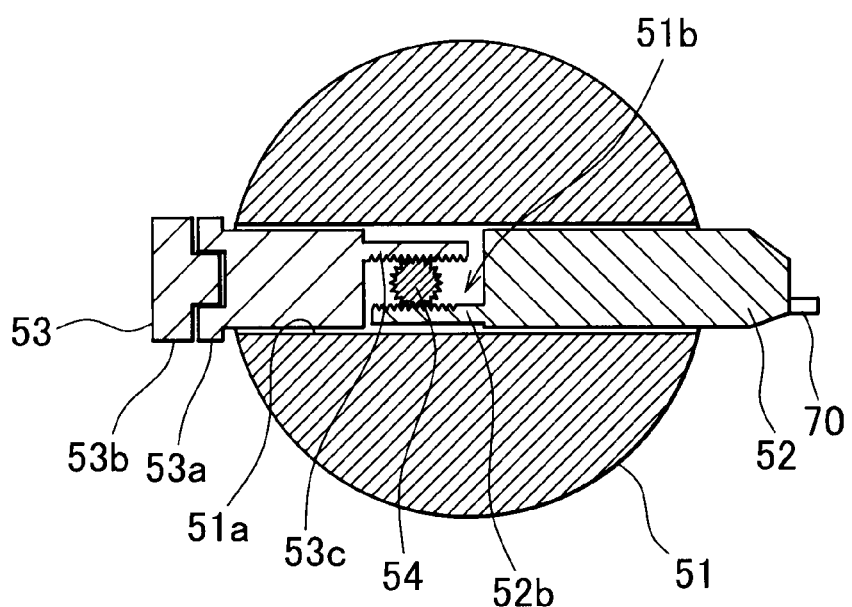
FIG. 3 is a sectional view taken along the line A-A in FIG. 2.

The urging member 58*b* is formed at a part of the external surface thereof with a taper portion 58*c* which descends or recedes as it goes toward the left as viewed in FIG. 2. The taper portion 58*c* is not required to be formed over the whole circumference of the urging member 58*b* and suffices to be formed only in a predetermined angular range. The taper portion 58*c* is always in contact with the taper or inclined surface on the engaging protrusion portion 57*c* of the clamping member 57. That is, the taper portion 58*c* and the engaging protrusion portion 57*c* of the clamping member 57 are held in wedge engagement. The position where the inclined surface on the engaging protrusion portion 57*c* of the clamping member 57 contacts the taper portion 58*c* differs in dependence on the sliding position of the urging member 58*b*. Thus, the urging force with which the clamping member 57 clamps the coarse motion movable member 52 is adjusted in dependence on the sliding position of the urging member 58*b*.

(Fine Adjusting Method of Tool Radius by Fine Motion Adjusting Mechanism)

Figure 4:
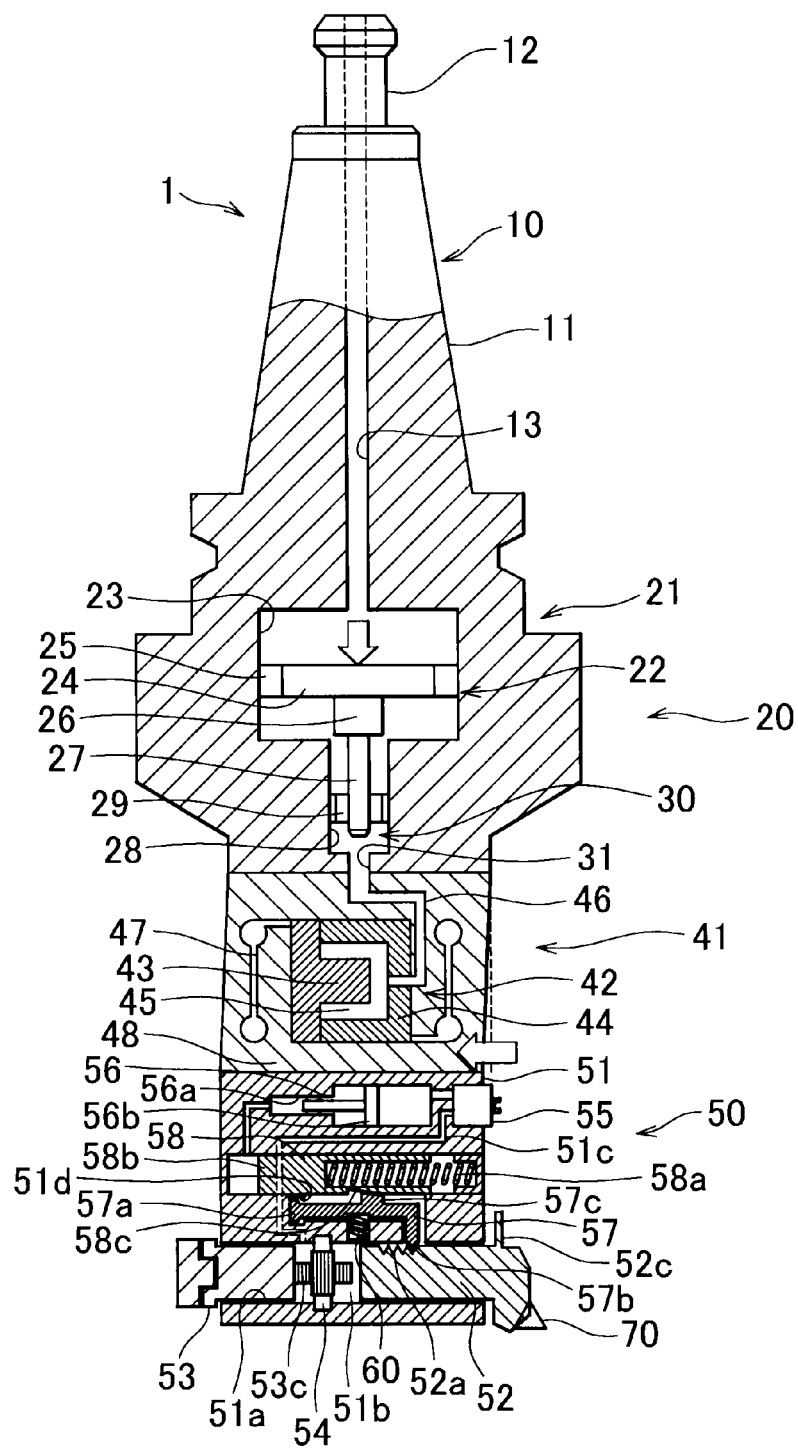
FIG. 4 is an axial partial sectional view of the boring holder in a state where a fine motion adjusting mechanism has been adjusted.

Next, a fine adjusting method of the tool radius by the fine motion adjusting mechanism 20 will be described in detail with reference to FIGS. 1 and 4. Let it be now assumed that air at a predetermined controlled pressure is supplied from the tool spindle 2 side. Then, the first piston 24 of the air-oil pressure transforming section 22 is slidden toward the distal end side of the boring holder 1 in dependence on the air pressure. With movement of the first piston 24, the second piston 27 is also slidden toward the distal end side of the boring holder 1. The movement of the second piston 27 causes the operating oil filled in the operating oil chamber 30 to increase in pressure. The increase in the pressure of the operating oil is led through the communication passage 31 and the oil passage 46 to the oil pressure chamber 45 of the elastic deformation section 41, and the pressure in the oil pressure chamber 45 is increased. As a result, the fine motion portion 48 of the elastic deformation section 41 is shifted toward the left as shown in FIG. 4.

In this way, the fine motion portion 48 of the elastic deformation section 41 is finely moved radially relative to the base end body portion 21, whereby the coarse motion adjusting mechanism 50 which is attached on the fine motion portion 48 side of the elastic deformation section 41 is finely moved as a whole radially relative to the base end body portion 21. Therefore, the position relative to the rotational axis of the cutting blade 70 attached to the coarse motion movable member 52 is finely adjusted by the operation of the fine motion adjusting mechanism 20.

The amount of the fine motion adjustment is altered by adjusting the pressure of the air supplied from the tool spindle 2 side. The fine motion adjusting mechanism 20 serves to amplify the air pressure supplied from the tool spindle 2 side by the air-oil pressure transforming section 22. Therefore, it is possible to elastically deform the elastic deformation section 41 at a low air pressure. Further, the amount of the fine motion adjustment can be returned to zero by lowering to zero the air pressure supplied from the tool spindle 2 side. Because the fine motion adjustment by the fine motion adjusting mechanism 20 depends on the elastic deformation of the elastic deformation section 41, the amount of the fine motion adjustment is not so large. Conversely, the fine motion adjusting mechanism 20 is able to perform a very tiny or slight adjustment precisely.

(Coarse Adjusting Method of Tool Radius by Coarse Motion Adjusting Mechanism)

Next, the operation of the coarse motion adjusting mechanism 50 will be described in detail with reference to FIGS. 5 through 10. Since the coarse motion adjusting unit 80 is used in operating the coarse motion adjusting mechanism 50, description will first be described regarding the coarse motion adjusting unit 80.

Figure 5:
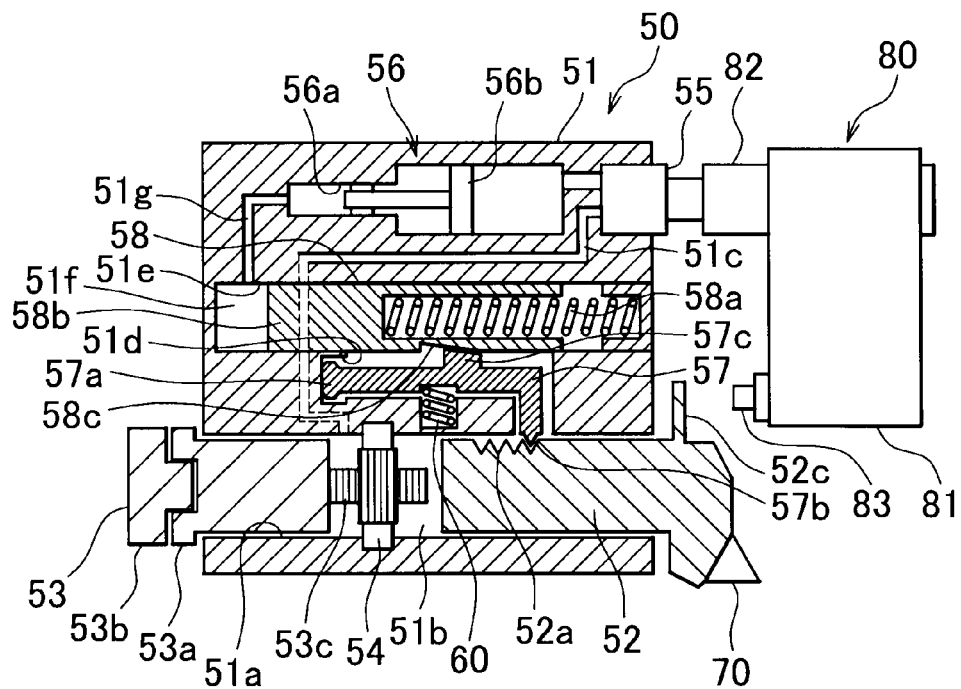
FIG. 5 is a view illustrating a coupling step for the coarse motion adjusting mechanism.

As shown in FIG. 5, the coarse motion adjusting unit 80 is provided with a fluid supply device 81, a fluid supply slidable port 82 and a position adjusting reference member 83. The fluid supply device 81 is a device which is configured to supply air and to be able to control the air pressure it supplies. The device 81 is fixedly provided on, for example, a bed (not shown) of a machining center. In this particular embodiment, where the device 81 is applied to a machining center of the construction that the tool spindle 2 is movable relative to the bed, the fluid supply device 81 of the coarse motion adjusting unit 80 is provided movably relative to the tool spindle 2.

The fluid supply slidable port 82 is a port which is adapted to be coupled to the fluid receiving port 55 of the coarse motion adjusting mechanism 50 and which is able to supply the fluid receiving port 55 with the air supplied from the fluid supply device 81. The slidable port 82 is provided slidably relative to the fluid supply device 81 in the left-right direction as viewed in FIG. 5. Further, the slidable port 82 is provided with a first coupling port mating with the first port of the fluid receiving port 55 and a second coupling port mating with the second port of fluid receiving port 55. The fluid supply device 81 is configured to make a switching between supplying pressurized air from the first coupling port of the fluid supply slidable port 82 and supplying pressure air from the second coupling port. The position adjusting reference member 83 is secured to the fluid supply device 81 and is provided to be contactable with the reference portion 52c provided on the coarse motion movable body 52.

Next, an adjusting method of the tool radius by the coarse motion adjusting mechanism 50 will be described. First of all, as shown in FIG. 5, the tool spindle 2 and the coarse motion adjusting unit 80 are relatively moved to couple the fluid receiving port 55 of the coarse motion adjusting mechanism 50 to the fluid supply slidable port 82 of the coarse motion adjusting unit 80 (coupling step). More specifically, the first and second ports of the fluid receiving port 55 are coupled respectively to the first and second coupling ports of the fluid supply slidable port 82. At this time, the fluid supply slidable port 82 of the coarse motion adjusting unit 80 is held in a state that it has been shifted to the leftmost position as shown in FIG. 5. Further, in this state, the reference portion 52c of the coarse motion movable body 52 is in position to face the position adjusting reference member 83 of the coarse motion adjusting unit 80.

Figure 6:
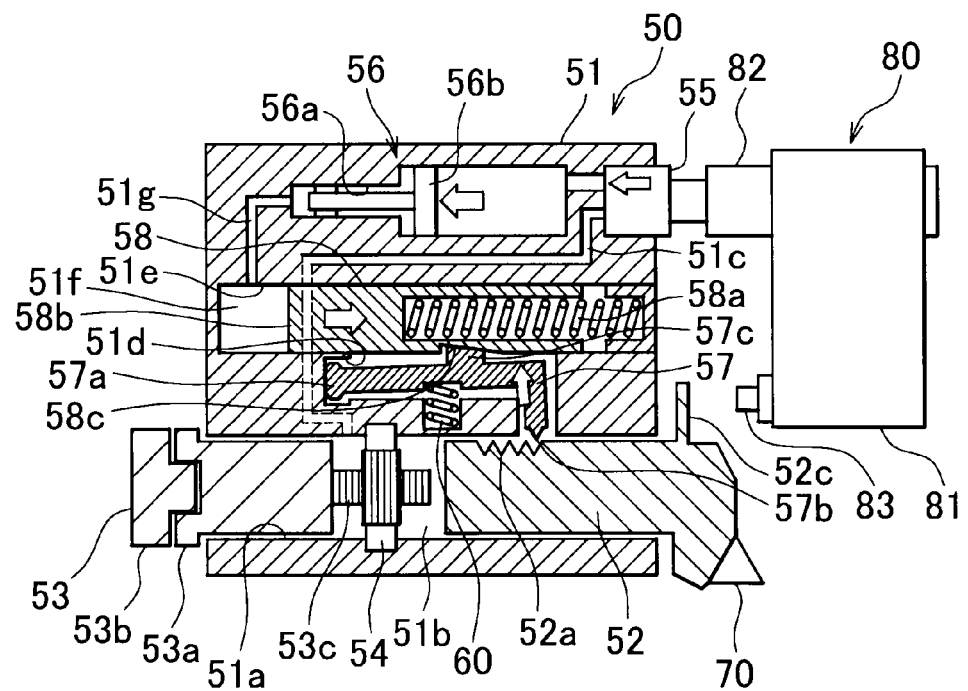
FIG. 6 is a view illustrating an unclamping step for the coarse motion adjusting mechanism.

Then, as shown in FIG. 6, the fluid supply device 81 supplies pressurized air to the right-side chamber of the large-diameter disc portion of the piston 56b in the stepped cylinder 56a of the air-oil pressure transforming section 56 through the second coupling port of the fluid supply slidable portion 82 and through the second port of the fluid receiving portion 55. Thus, the piston 56b of the air-oil pressure transforming section 56 is moved toward the left as viewed in FIG. 6 to raise the oil pressure in the chamber located at the left side of the small-diameter rod portion of the piston 56b in the stepped cylinder 56a as viewed in FIG. 6 as well as in the operating oil chamber 51f. With the pressure rising of the operating oil, the urging member 58b is slidden toward the right as viewed in FIG. 6 against the urging force of the second spring 58a. This causes the taper portion 58c formed on the external surface of the urging member 58b to be shifted toward the right as viewed in FIG. 6. With this, the contact position between the engaging protruding portion 58c of the clamping member 57 and the taper portion 58c is moved upward. Thus, the urging force of the first spring 60 causes the clamping member 57 to pivot counterclockwise in FIG. 6 about the support portion 57a, whereby the claw 57b is disengaged from one of the grooves 52a on the coarse motion movable body 52. As a result, the coarse motion movable body 52 is unclamped from the coarse motion housing 51 (unclamping step). At this time, the fluid supply device 81 keeps constant the air pressure supplied to the second coupling port side of the fluid supply slidable port 82.

Figure 7:
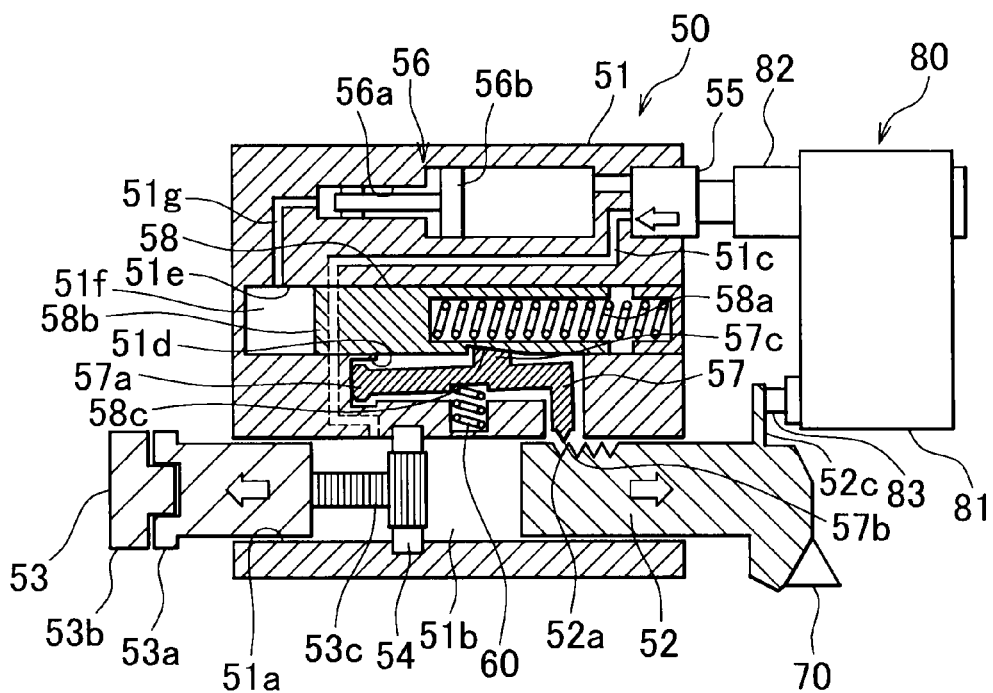
FIG. 7 is a view illustrating a contact step for the coarse motion adjusting mechanism.

Subsequently, as shown in FIG. 7, the fluid supply device 81 supplies pressurized air to the air passage 51c through the first coupling port of the fluid supply slidable port 82 and through the first port of the fluid receiving port 55. Thus, the air pressure in the air residence chamber 51b is raised to generate a pressure which enlarges the volume of the air residence chamber 51b. With the air pressure rising in the air residence chamber 51b, the coarse motion movable member 52 and the couterweight 53 are slidden in the directions to go away from each other, that is, are slidden mutually radially outward. The coarse motion movable body 52, the couterweight 53 and the pinion shaft 54 constitute a rack-and-pinion mechanism. Therefore, the radially outward sliding movement of the coarse motion movable member 52 and the radially outward sliding movement of the couterweight 53 are synchronized and linked together. The sliding amount of the coarse motion movable body 52 and sliding amount of the couterweight 53 are the same but opposite in direction.

When the coarse motion movable body 52 is slidden radially outward in this way, the reference portion 52c of the coarse motion movable body 52 is brought into contact with the position adjusting reference member 83 of the coarse motion adjusting unit 80 (contact step). At this time, the position of the cutting blade 70 has been moved to a predetermined position (e.g., the farthest position) in a direction to go away from the rotational axis of the boring holder 1. That is, in the state that the fluid supply slidable port 82 is at the leftmost position relative to the fluid supply device 81 as viewed in FIG. 7 and has been coupled with the fluid receiving portion 55 and that the reference portion 52c of the coarse motion movable member 52 is in contact with the position adjusting reference member 83, the position of the cutting blade 70 relative to the rotational axis, that is, the tool radius has been known. This state will be referred to a reference state. That is, the reference state is established at the contact step.

Figure 8:
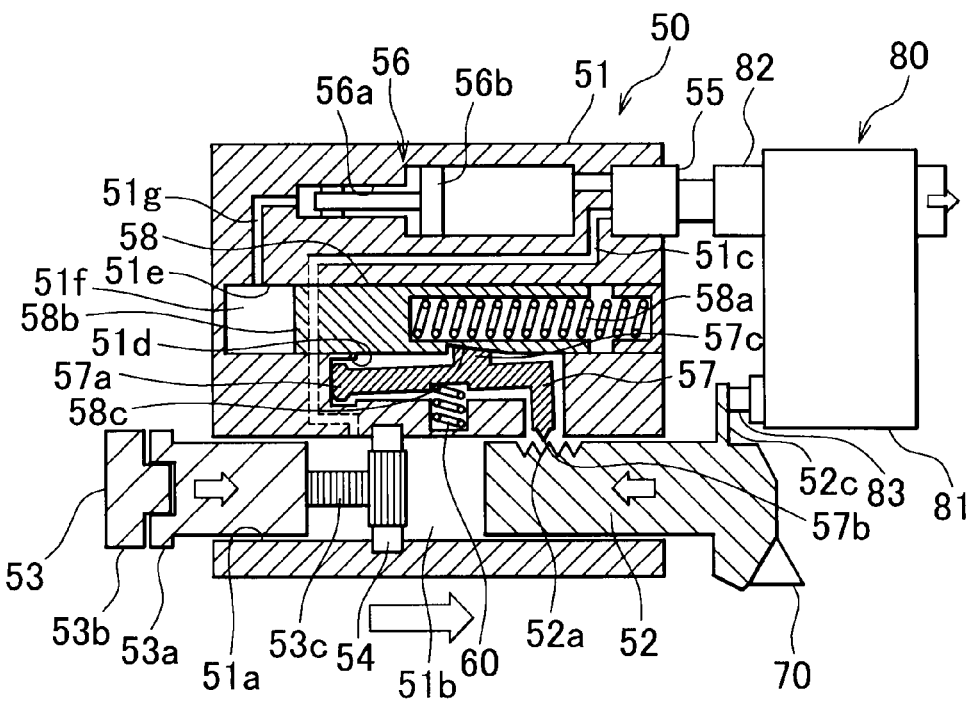
FIG. 8 is a view illustrating an adjusting step for the coarse motion adjusting mechanism.

Subsequently, as shown in FIG. 8, the relative position between the tool spindle 2 and the position adjusting reference member 83 is changed from the reference state in a direction to come close to each other. For example, in a machining center with one or more drive axes for moving the tool spindle 2, one of the drive axes is operated to move the tool spindle 2 in the direction to come close to the position adjusting reference member 83. In this case, the tool radius in the reference state has already been known, and a target tool radius has also been grasped. Therefore, the tool spindle 2 is moved by the difference between the target tool radius and the tool radius in the reference state in the direction to come close to the position adjusting reference member 83. In this way, the coarse adjustment is made regarding the position of the cutting blade 7 relative to the rotational axis, that is, the tool radius (adjusting step).

When the position of the cutting blade 70 relative to the rotational axis is adjusted at this adjusting step, the air which was supplied to slide the coarse motion movable member 52 relative to the coarse motion housing 51 in the direction that the position of the cutting blade 70 goes away from the rotational axis is exhausted outside through the slight clearance between each of the coarse motion movable member 52 and the counterweight 53 and the round hole 51*a* formed in the coarse motion housing 51.

Figure 9:
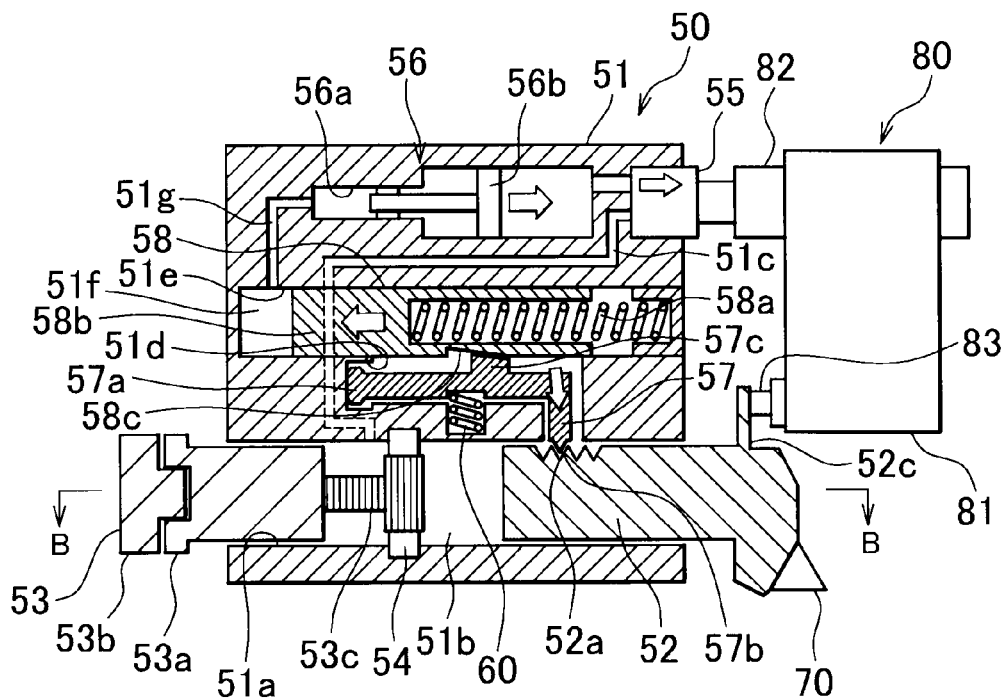
FIG. 9 is a view illustrating a clamping step for the coarse motion adjusting mechanism.
Figure 10:
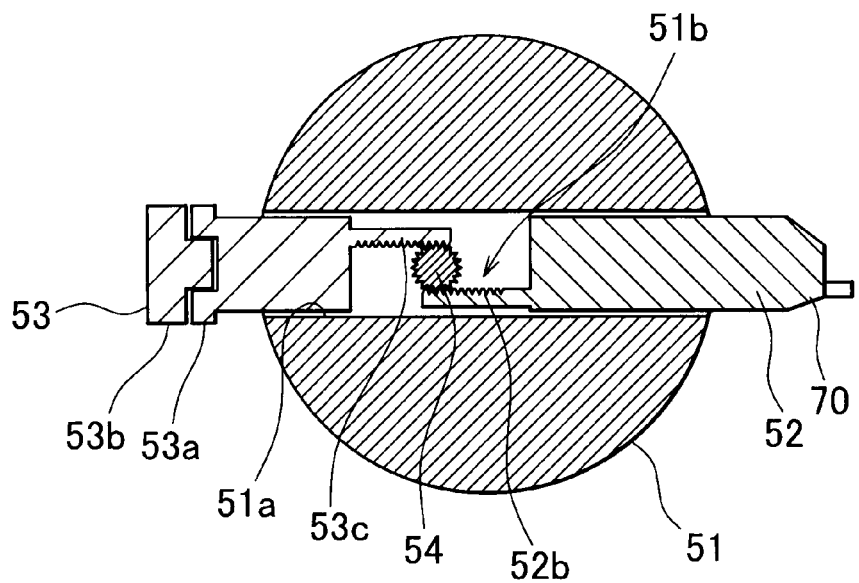
FIG. 10 is a sectional view taken along the line B-B in FIG. 9.

Then, as shown in FIGS. 9 and 10, the fluid supply device 81 lowers the air pressure which it has supplied until then through the second coupling port of the fluid supply slidable port 82 and through the second port of the fluid receiving port 55. Thus, the piston 56*b* of the air-oil pressure transforming section 56 is moved toward the right as viewed in FIG. 9, and the oil pressure is lowered in the chamber on the left side as viewed in FIG. 9 of the small-diameter rod portion of the piston 56*b* in the stepped cylinder 56*a* as well as in the operating oil chamber 51*f*. With the pressure drop of the operating oil, the urging member 58*b* is slidden toward the left as viewed in FIG. 9 by means of the urging force of the second spring 58*a*. Thus, the position of the taper portion 58*c* formed on the external surface of the urging member 58*b* is shifted toward the left as viewed in FIG. 9. This results in moving the contact potion between the engaging protruding portion 57*c* of the clamping member 57 and the taper portion 58*c* downward as viewed in FIG. 9. Thus, the clamping member 57 is pivoted clockwise as viewed in FIG. 9 about the support portion 57*a* against the urging force of the first spring 60, whereby the claw 57*b* is pressed against the external surface of the coarse motion movable member 52. At this time, the claw 57*b* is pressed on and engaged with one of the grooves 52*a* on the coarse motion movable member 52. As a consequence, the coarse motion movable member 52 is clamped on the coarse motion housing 51 (clamping step).

(Construction of Machine Tool)

As an example of a machine tool that is provided with the above-described boring holder 1 and coarse motion adjusting unit 80, a machining center 100 will be described with reference to FIG. 11. Note that the machining center 100 described in the present embodiment is just an example, and the invention may be applied to other horizontal machining centers and vertical machining centers.

Figure 11:
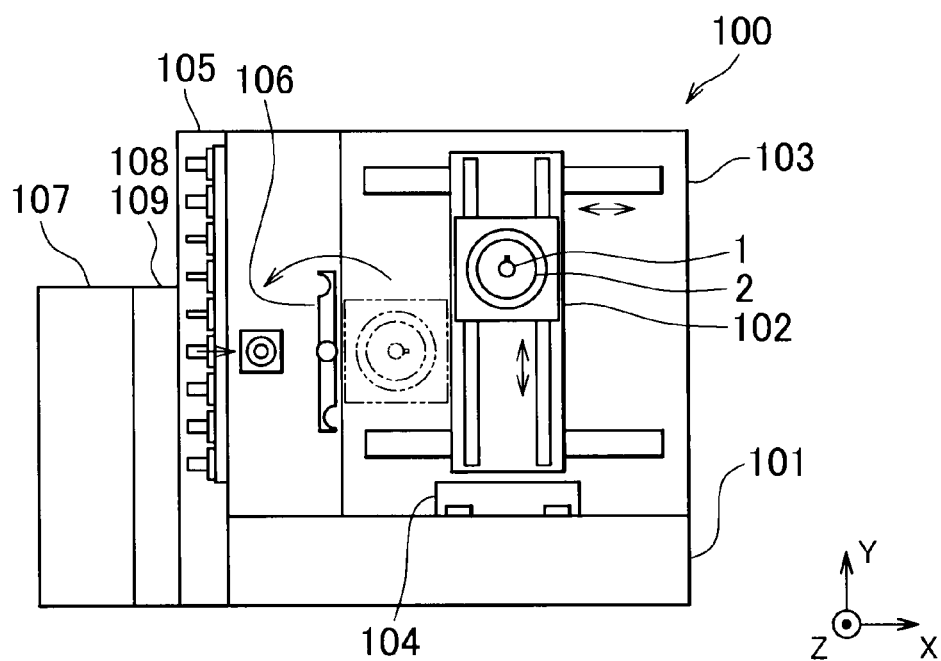
FIG. 11 is a front view of a machine tool viewed from the axial direction of a tool spindle.

As shown in FIG. 11, the machining center 100 is a horizontal machining center. The machining center 100 includes a bed 101, a spindle head 102, a column 103, a table 104, a tool magazine 105, a tool changer 106, a main control unit (not shown), a tool radius adjusting device 107, a carrier device 108, and a carrier control unit 109.

The spindle head 102 includes the tool spindle 2 to which a tool may be fitted as described above. The spindle head 102 is arranged so as to be movable in the X-axis direction and the Y-axis direction relative to the column 103 fixed to the bed 101. The table 104 holds a workpiece, and is arranged on the bed 101 so as to be movable in the Z-axis direction relative to the bed 101.

Figure 12:
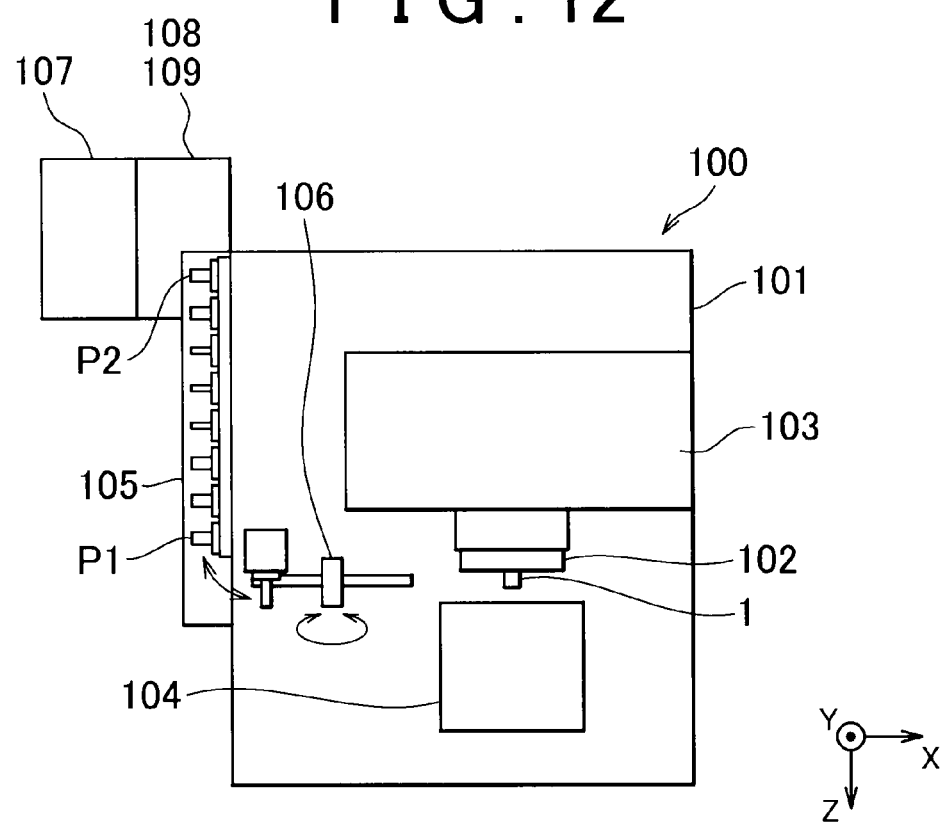
FIG. 12 is a plain view of the machine tool viewed from above the machine tool in FIG. 11.

The tool magazine 105 stores multiple tools. The tool magazine 105 stores, for example, multiple types of the above-described boring holders 1 having an adjustable tool radius and tools (for example, endmill) having a non-adjustable tool radius. In the tool magazine 105, a tool change index position P1 and a tool radius adjustment index position P2 are set to different positions. At the tool change index position P1, the tools are changed by the tool changer 106, which will be described later in detail. At the tool radius adjustment index position P2, the tools are exchanged between the tool magazine 105 and the carrier device 108 in order to make tool radius adjustment. As shown in FIG. 12, the tool change index position P1 is set to a position in the tool magazine 105, which is at the front side of the machine tool, and the tool radius adjustment index position P2 is set to another position in the tool magazine 105, which is at the rear side of the machine tool. The tool change index position P1 and the tool radius adjustment index position P2 are obtained by indexing, and positions the pockets of the tool magazine 105 correspond to the tool change index position P1 and the tool radius adjustment index position P2.

The tool changer 106 makes a changeover between the tool located at the tool change index position P1 in the tool magazine 105 and the tool fitted to the spindle head 102. Accordingly, the tool changer 106 is arranged between the spindle head 102 and the tool magazine 105. In the present embodiment, the subsequent tool, which will be picked up by the tool changer 106 to replace the tool fitted to the spindle head 102, is moved to a subsequent tool changing position by turning the tools stored in the tool magazine 105 90 degrees.

The tool radius adjusting device 107 includes the above-described coarse motion adjusting unit 80, and makes coarse motion adjustment of the boring holder 1. The tool radius adjusting device 107 makes coarse motion adjustment to the tool radius of the boring holder 1 picked out from the tool magazine 105, and is able to execute an operation for making coarse motion adjustment to the tool radius of the boring holder 1 in parallel with the execution of a machining program for executing an operation of the spindle head 102 and an operation of the tool changer 106. The detailed construction of the tool radius adjusting device 107 will be described later.

The carrier device 108 picks the boring holder 1, located at the tool radius adjustment index position P2, out from the tool magazine 105 and carries this boring holder 1 to the tool radius adjusting device 107, and returns the boring holder 1, of which the tool radius has been adjusted by the tool radius adjusting device 107, from the tool radius adjusting device 107 to the tool magazine 105. The carrier control unit 109 is formed integrally with the carrier device 108. The detailed construction of the carrier device 108 and the process executed by the carrier control unit 109 will be described later.

(Detailed Construction and Operation of Tool Radius Adjusting Device)

Next, the detailed construction of the tool radius adjusting device 107 will be described with reference to FIG. 13 to FIG.

15. The tool radius adjusting device 107 includes a base 210, a tool rotationally supporting device 220, a tool rotating motor 230, the coarse motion adjusting unit 80 that has been described with reference to FIG. 5 to FIG. 9, a tool radius measuring device 240, a horizontally sliding device 250, and a height adjusting device 260.

Figure 14:
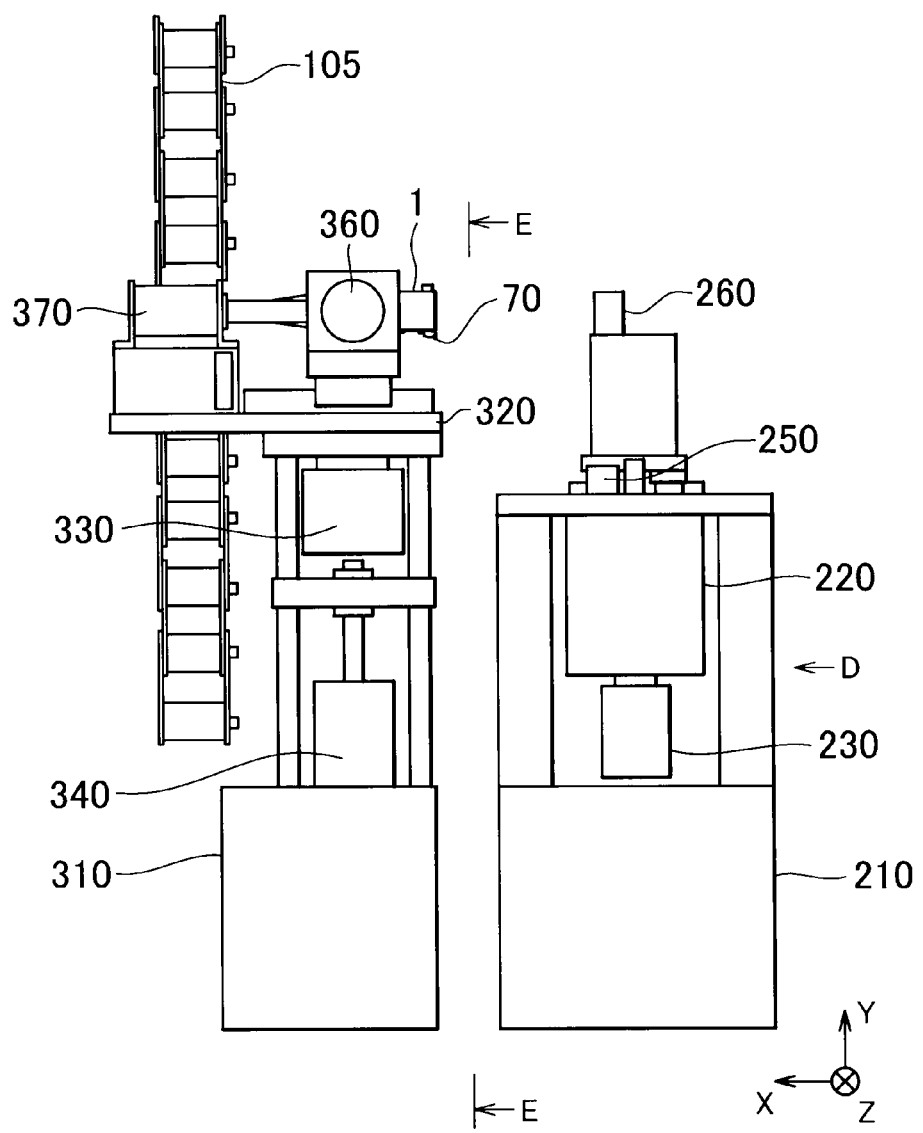
FIG. 14 is a view of the carrier device and the tool radius adjusting device viewed from the direction indicated by an arrow C in FIG. 13.
Figure 15:
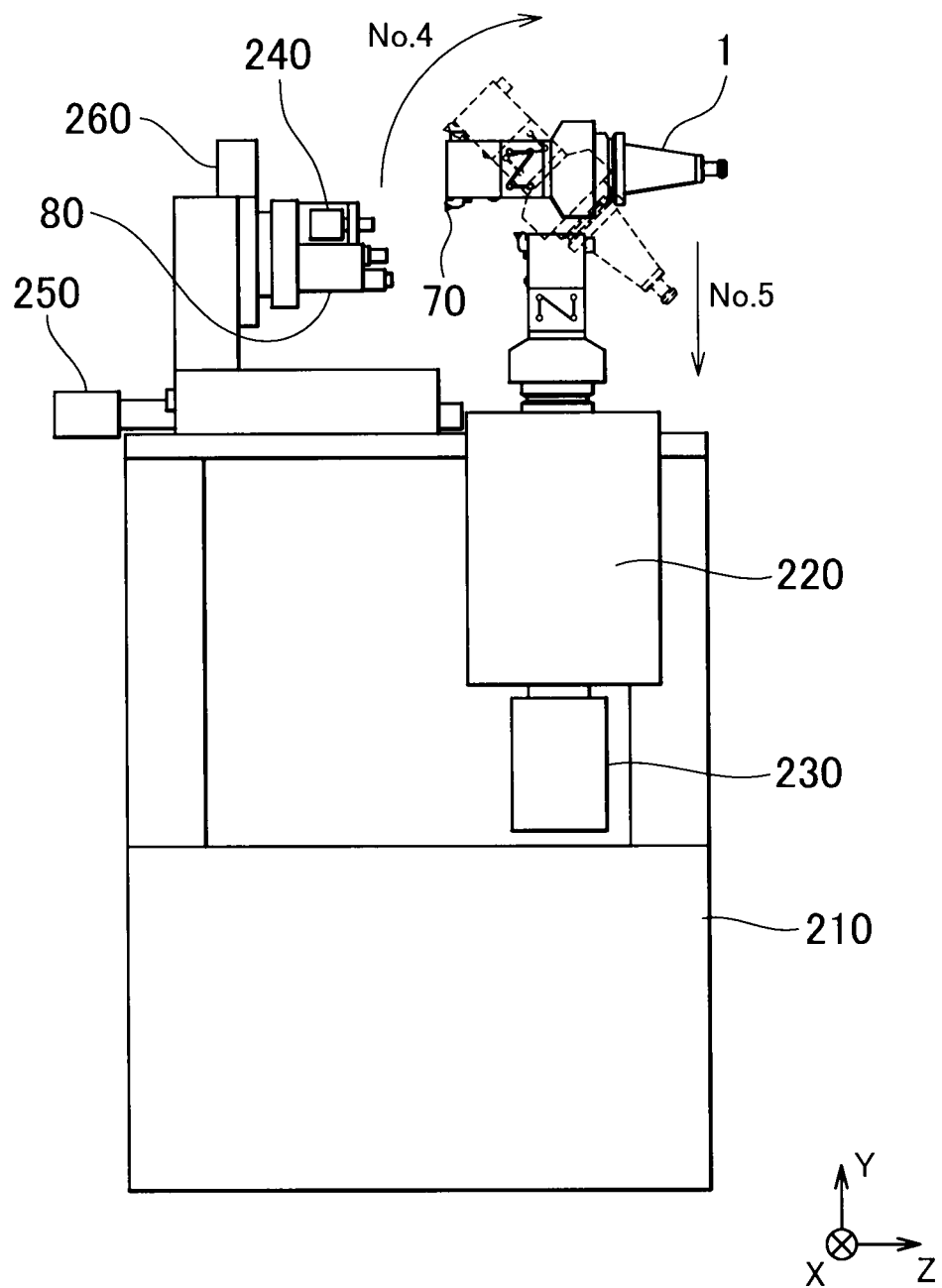
FIG. 15 is a view of the tool radius adjusting device viewed from the direction indicated by an arrow D in FIG. 14.

As shown in FIG. 14 and FIG. 15, the base 210 is fixed onto a floor, and arranged at the rear side of the machine tool, relative to the tool magazine 105. The tool rotationally supporting device 220 is fixed onto the base 210, as shown in FIG. 15. A tapered hole is formed in the top face of the tool rotationally supporting device 220. The taper shank portion 11 of the boring holder 1 is inserted into the tapered hole so that the boring holder 1 is positioned. In addition, the tool rotationally supporting device 220 is supported so as to be rotatable relative to the base 210. The rotational axis of the tool rotationally supporting device 220 extends in the direction perpendicular to the floor face (in the vertical direction). That is, the tool rotationally supporting device 220 supports the boring holder 1 such that the axis of the boring holder 1 extends in the vertical direction, as shown in FIG. 15. The tool rotating motor 230 is arranged below the tool rotationally supporting device 220, and rotates the tool rotationally supporting device 220 about the vertical axis.

Figure 13:
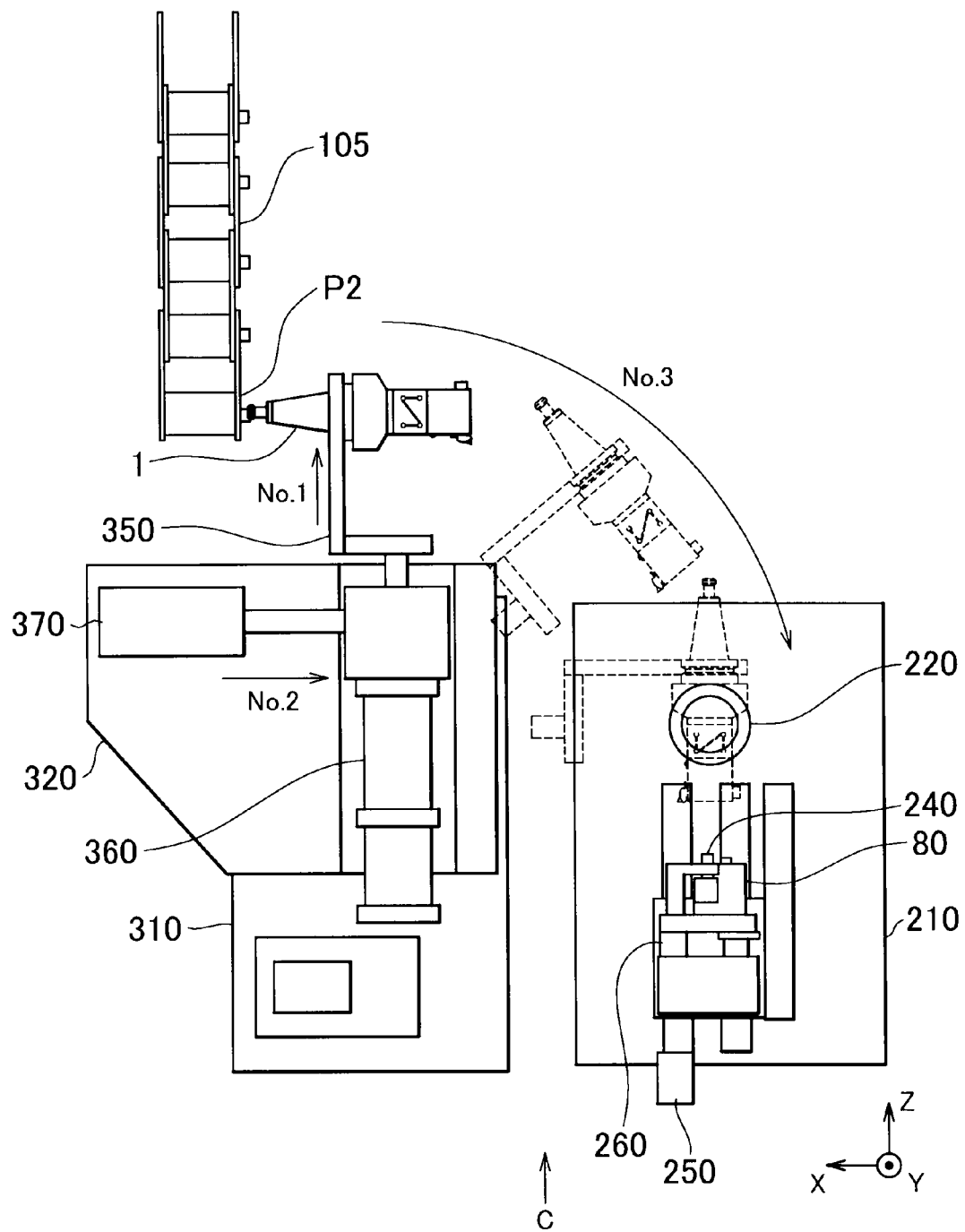
FIG. 13 is an enlarged plain view of a carrier device and a tool radius adjusting device.

The coarse motion adjusting unit 80 is arranged above the top face of the base 210 so as to face the top face of the tool rotationally supporting device 220 in the horizontal direction (Z-axis direction), as shown in FIG. 13 and FIG. 15. Having been described above, the details of the coarse motion adjusting unit 80 will not be described here. The tool radius measuring device 240 is used to measure the tool radius of the boring holder 1 supported by the tool rotationally supporting device 220. The tool radius measuring device 240 is provided integrally with the coarse motion adjusting unit 80, and arranged slightly above the coarse motion adjusting unit 80.

The horizontally sliding device 250 is arranged above the top face of the base 210, as shown in FIG. 15, and allows the coarse motion adjusting unit 80 and the tool radius measuring device 240 to slide in the lateral direction in FIG. 15 (Z-axis direction) relative to the base 210. The sliding motion is produced by a motor. The height adjusting device 260 is provided at the horizontally sliding device 250, as shown in FIG. 15, and used to adjust the vertical heights of the coarse motion adjusting unit 80 and the tool radius measuring device 240. That is, the height adjusting device 260 is a mechanism to make it possible to apply the coarse motion adjusting unit 80 and the tool radius measuring device 240 to various types of boring holders 1 because axial tool length varies depending on the types of these boring holders 1.

The operation of the tool radius adjusting device 107 will be described. As shown in FIG. 15, the boring holder 1 that has been carried by the carrier device 108 is supported by the tool rotationally supporting device 220. Subsequently, the tool rotating motor 230 is driven to rotate the boring holder 1 such that the cutting blade 70 of the boring holder 1 faces the coarse motion adjusting unit 80. Then, the horizontally sliding device 250 is driven to bring the coarse motion adjusting unit 80 into contact with the boring holder 1, and coarse motion adjustment is made to the tool radius. Next, the tool radius of the boring holder 1 is measured by the tool radius measuring device 240.

When the boring holder 1 is arranged at the tool radius adjusting device 107, the tool axis direction of the boring holder 1 coincides with the vertical direction. Thus, an operator can place a new boring holder 1 in the tool magazine 105 by arranging the new boring holder 1 at the tool radius adjusting device 107 and operating the carrier device 108. Especially, the mass of the boring holder 1 having an adjustable tool radius may be heavy. Therefore, it is not easy to carry and fit the high-mass boring holder 1 such that the tool axis direction of the boring holder 1 coincides with horizontal direction, in order to directly place the boring holder 1 in the tool magazine 105. In contrast to this, even if the boring holder 1 has a high mass, it is relatively easy to carry and fit the boring holder 1 such that the tool axis direction of the boring holder 1 coincides with the vertical direction. That is, it is possible to more easily place the high-mass boring holder 1 in the tool magazine 105 if the boring holder 1 is placed in the tool magazine 105 via the tool radius adjusting device 107.

(Detailed Construction and Operation of Carrier Device)

Next, the detailed construction of the carrier device 108 will be described with reference to FIG. 13, FIG. 14 and FIG. 16. The carrier device 108 includes a base 310, a turning table 320, a table turning motor 330, a table elevating cylinder 340, a holder supporting arm 350, an arm straight moving and tool axis direction changing actuator 360, and a holder picking-placing straight moving cylinder 370.

Figure 16:
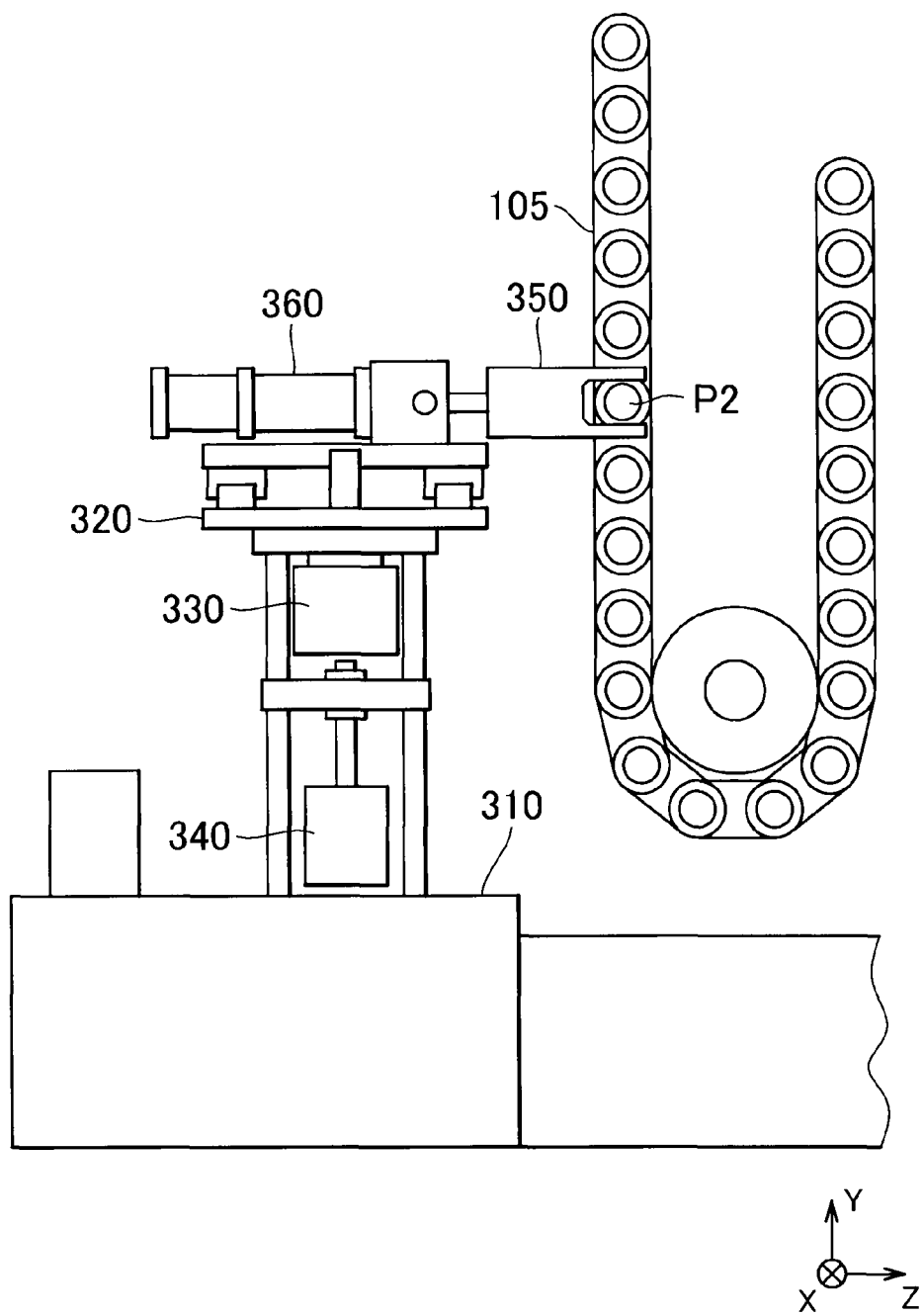
FIG. 16 is a view of the carrier device viewed from the direction indicated by an arrow E in FIG. 14.

As shown in FIG. 14 and FIG. 16, the base 310 is fixed onto the floor, and is arranged between the tool magazine 105 and the tool radius adjusting device 107. The turning table 320 is supported so as to be rotatable about the axis extending in the vertical direction (Y-axis direction) relative to the base 310 and vertically movable relative to the base 310. The table turning motor 330 turns the turning table 320 about the vertical axis relative to the base 310. The table elevating cylinder 340 moves the turning table 320 up and down in the vertical direction relative to the base 310.

The holder supporting arm 350 is supported above the turning table 320, and is able to support the boring holder 1. In the state in FIG. 13, the holder supporting arm 350 is movable in the Z-axis direction, rotatable about the Z-axis and movable in the X-axis direction relative to the turning table 320. That is, the holder supporting arm 350 is movable in the Y-axis direction (vertical direction) and rotatable about the Y-axis (vertical axis) relative to the base 310, and is movable in the Z-axis direction, rotatable about the Z-axis and movable in the X-axis direction relative to the base 310 in the state in FIG. 13.

The arm straight moving and tool axis direction changing actuator 360 is arranged above the turning table 320, and moves the holder supporting arm 350 in the Z-axis direction and rotates the holder supporting arm 350 about the Z-axis direction relative to the turning table 320 in the state in FIG. 13. That is, the arm straight moving and tool axis direction changing actuator 360 moves in the Z-axis direction in the state in FIG. 13, thereby causing the holder supporting arm 350 to grasp the boring holder 1, positioned at the tool radius adjustment index position P2 (shown in FIG. 12) of the tool magazine 105, or causing the holder supporting arm 350 to release the boring holder 1 supported by the holder supporting arm 350 at the tool radius adjustment index position P2. In addition, the arm straight moving and tool axis direction changing actuator 360 rotates about the Z-axis as shown in FIG. 15, thereby changing the tool axis direction of the boring holder 1 between the horizontal direction and the vertical direction.

The holder picking-placing straight moving cylinder 370 is arranged above the turning table 320, and moves the holder supporting arm 350 in the X-axis direction relative to the turning table 320 in the state in FIG. 13. That is, the holder picking-placing straight moving cylinder 370 causes the holder supporting arm 350 to pick up the boring holder 1 positioned at the tool radius adjustment index position P2

(shown in FIG. 12) of the tool magazine 105, or causes the holder supporting arm 350 to place the boring holder 1 supported by the holder supporting arm 350 at the tool radius adjustment index position P2, in the state in FIG. 13.

The operation of the carrier device 108 will be described below. As indicated by an arrow "No. 1" in FIG. 13, the holder supporting arm 350 is moved in the Z-axis direction by the arm straight moving and tool axis direction changing actuator 360 in the state in FIG. 13. Due to this operation, the holder supporting arm 350 grasps the boring holder 1 stored at the tool radius adjustment index position P2 of the tool magazine 105. Subsequently, as indicated by an arrow "No. 2" in FIG. 13, the holder supporting arm 350 is moved in the X-axis direction by the holder picking-placing straight moving cylinder 370. Due to this operation, the holder supporting arm 350 picks the boring holder 1 out from the tool radius adjustment index position P2 of the tool magazine 105.

Next, as indicated by an arrow "No. 3" in FIG. 13, the turning table 320 is turned 90 degrees by the table turning motor 330 in the state in FIG. 13. Due to this operation, the boring holder 1 supported by the holder supporting arm 350 is moved to a position above the tool rotationally supporting device 220 of the tool radius adjusting device 107. Note that, at this time, the tool axis direction of the boring holder 1 still coincides with the horizontal direction.

Next, as indicated by an arrow "No. 4" in FIG. 15, the holder supporting arm 350 is rotated 90 degrees by the arm straight moving and tool axis direction changing actuator 360. Due to this operation, the tool axis direction of the boring holder 1 supported by the holder supporting arm 350 is brought to the vertical direction, and thus coincides with the axial direction of the tool rotationally supporting device 220 of the tool radius adjusting device 107 such that the boring holder 1 is coaxial with the tool rotational supporting device 220.

Next, as indicated by an arrow "No. 5" in FIG. 15, the turning table 320 is moved downward by the table elevating cylinder 340. Due to this operation, the boring holder 1 supported by the holder supporting arm 350 is supported by the tool rotationally supporting device 220 of the tool radius adjusting device 107. When the boring holder 1 is carried from the tool radius adjusting device 107 to an empty pocket of the tool magazine 105, the above-described operations are executed in the reverse order.

(Processes by Machine Tool)

Figure 20:
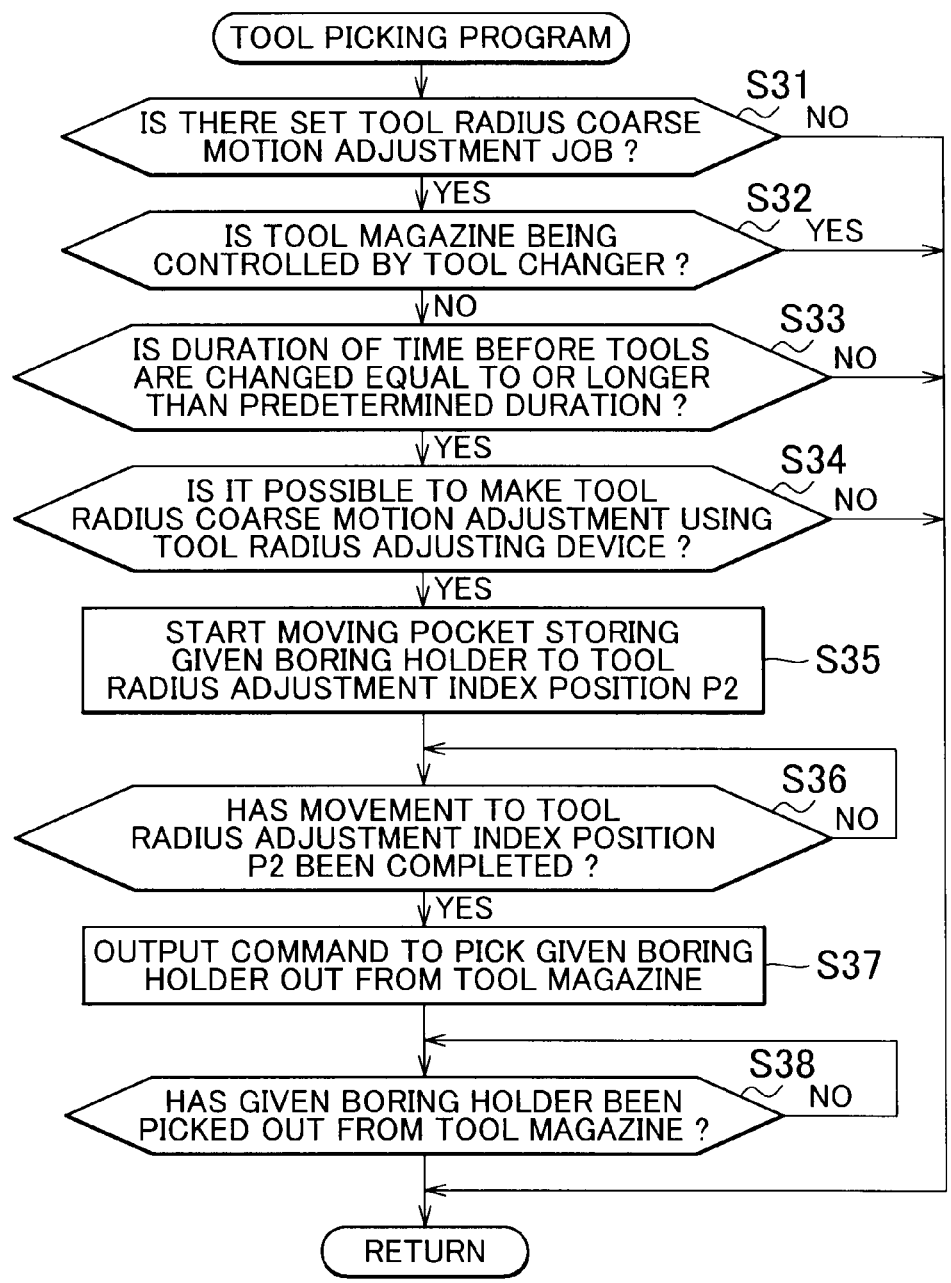
FIG. 20 is a flowchart showing a process of a tool picking program.
Figure 21:
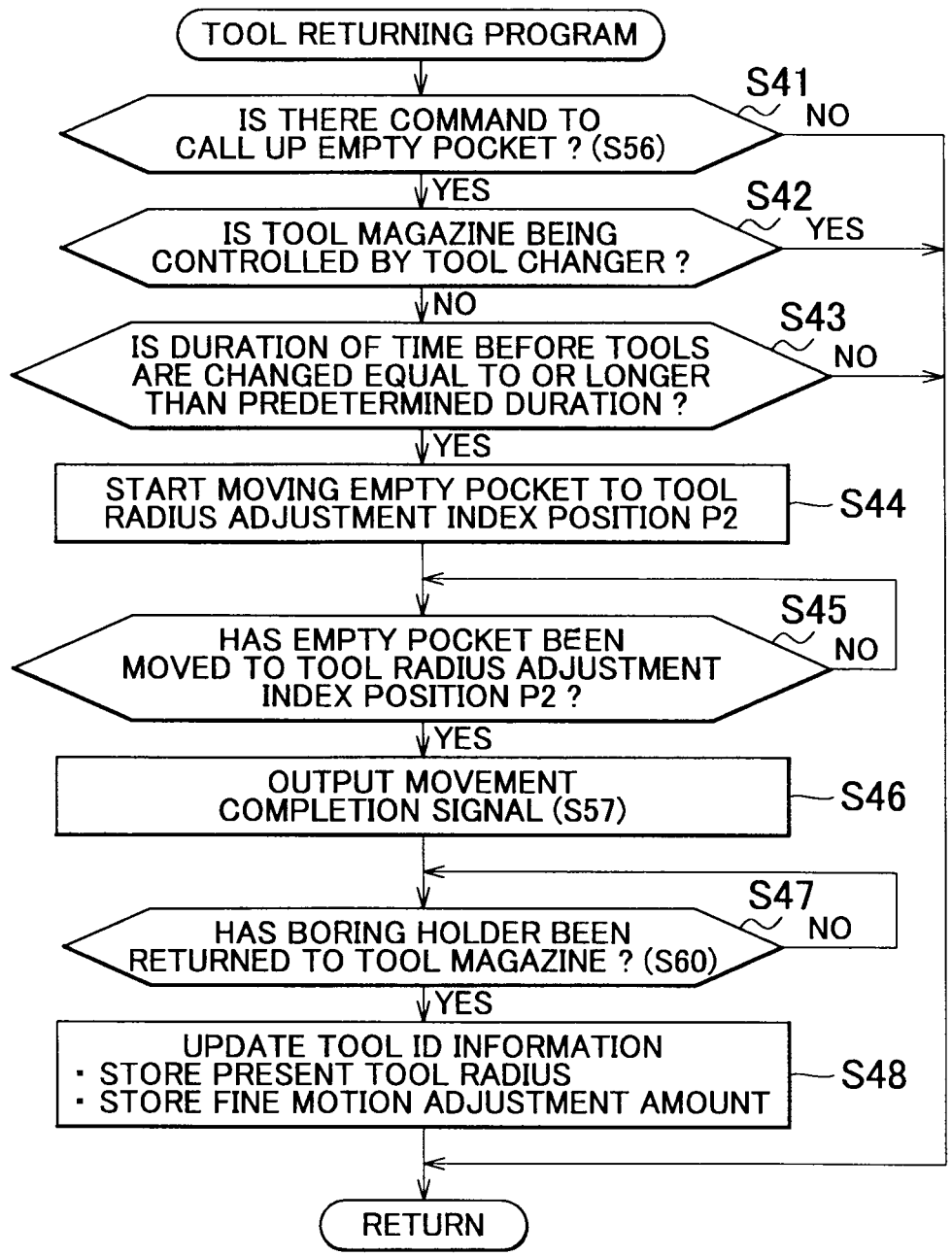
FIG. 21 is a flowchart showing a process of a tool returning program.
Figure 22:
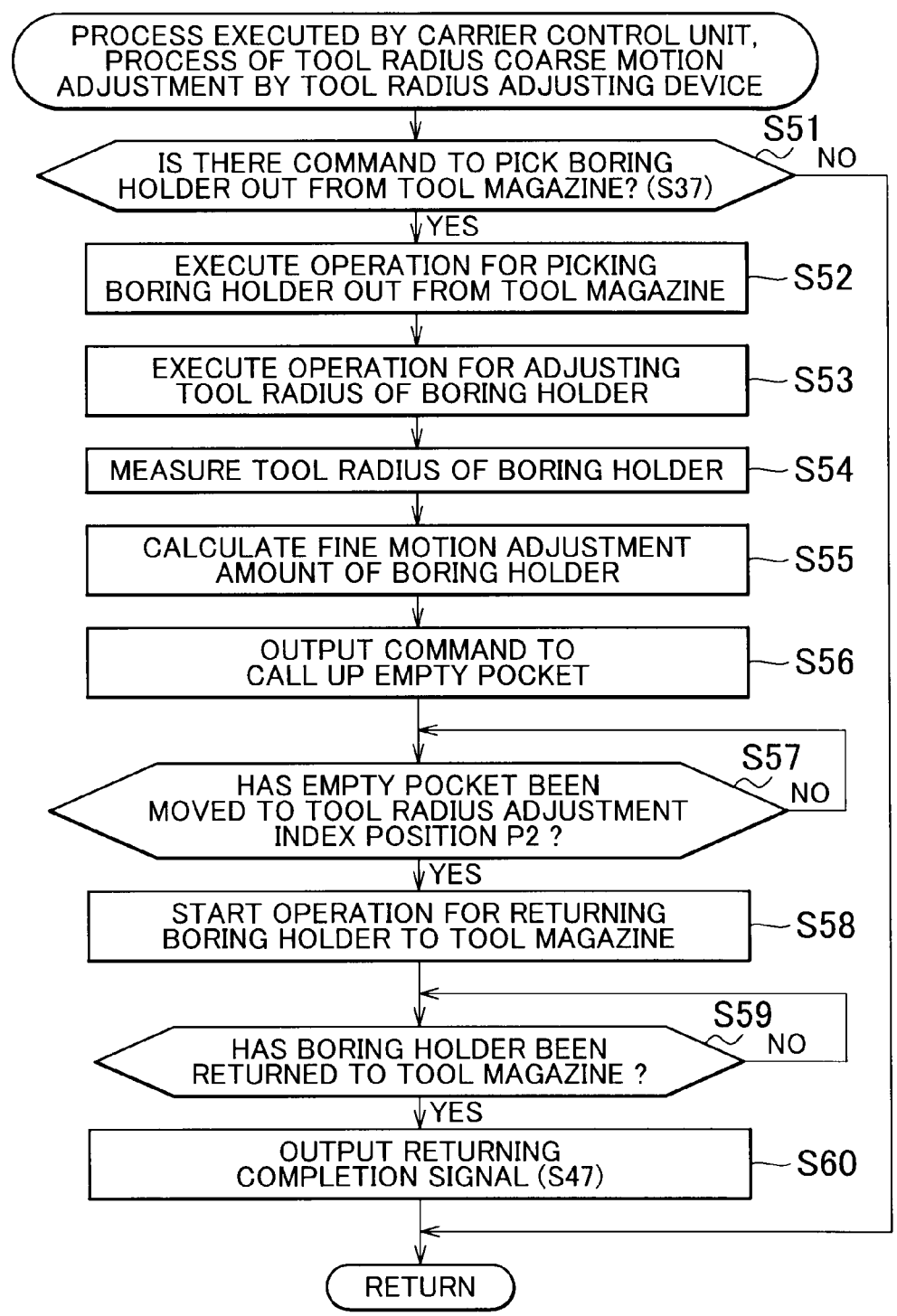
FIG. 22 is a flowchart showing a process executed by a carrier control unit and a process of tool radius adjustment made by the tool radius adjusting device.

Next, the processes by the machine tool that includes the tool radius adjusting device 107 will be described with reference to FIG. 17 to FIG. 22. The programs shown in FIG. 17 to FIG. 21 are executed by the main control unit of the machine tool, and the program shown in FIG. 22 is executed by the carrier control unit 109 and the tool radius adjusting device 107.

Figure 17:
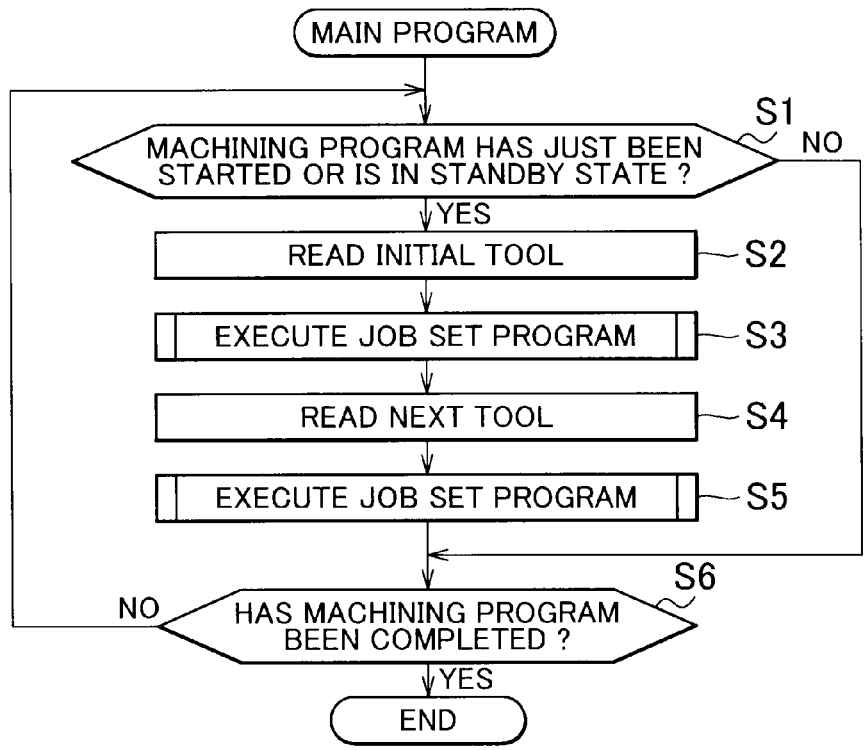
FIG. 17 is a flowchart showing a process of a main program.

As shown in FIG. 17, the main control unit of the machine tool determines whether there is satisfied one of the condition that the machining program has just been started and is in its initial stage (hereinafter, referred to as "condition that the machining program has just been started") and the condition that the machining program is in the standby state because the tool is under preparation (hereinafter, referred to as "condition that the machining program is in the standby state") (step S1). If none of the conditions is satisfied, the machining program is in its middle stage and not in the standby state. Therefore, it is determined whether the machining program has been completed (step S6). If the machining program has not been completed, the process returns to step S1. On the other hand, if the machining program has been completed, the main program ends.

If it is determined in step S1 that one of the condition that the machining program has just been started and the condition that the machining program is in the standby state is satisfied, the initial tool information is read from the present time in the machining program (step S2). Next, the job set program is executed with regard to the read tool (step S3). The job set program, which will be described later in detail, is a process stored as a job for making tool radius adjustment, using the tool radius adjusting device, on a tool that needs coarse motion adjustment to its tool radius. Next, when the job set program for the initial tool is completed, the information on the next tool in the machining program is read (step S4). Then, the job set program is executed for the read tool (step S5). When the job set program for this next tool is completed, it is determined whether the machining program has been completed (step S6). If the machining program has not been completed, the process returns to step S1. On the other hand, the machining program has been completed, the main program ends.

Figure 18:
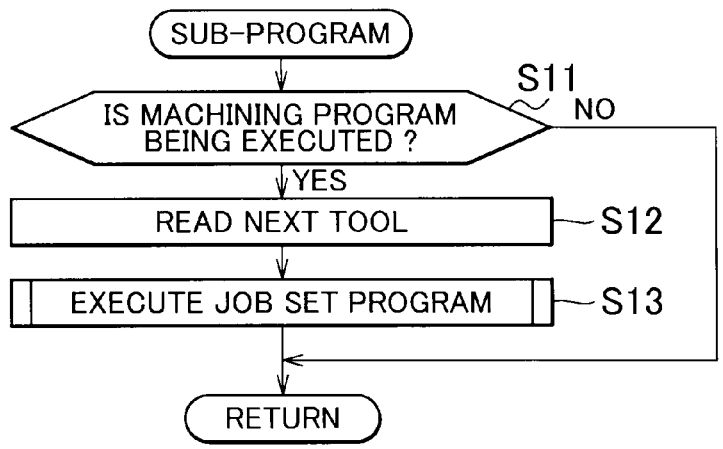
FIG. 18 is a flowchart showing a process of a sub-program.

The process of the sub-program executed by the main control unit of the machine tool will be described with reference to FIG. 18. The process of the sub-program is executed in parallel with the process of the main program. First, it is determined whether the machining program is being executed (S11). If the machining program is being executed, the tool in the machining program, which is used next to the tool for which the job set program has been executed, is read (step S12). Next, the job set program is executed for the read tool (step S13).

Figure 19:
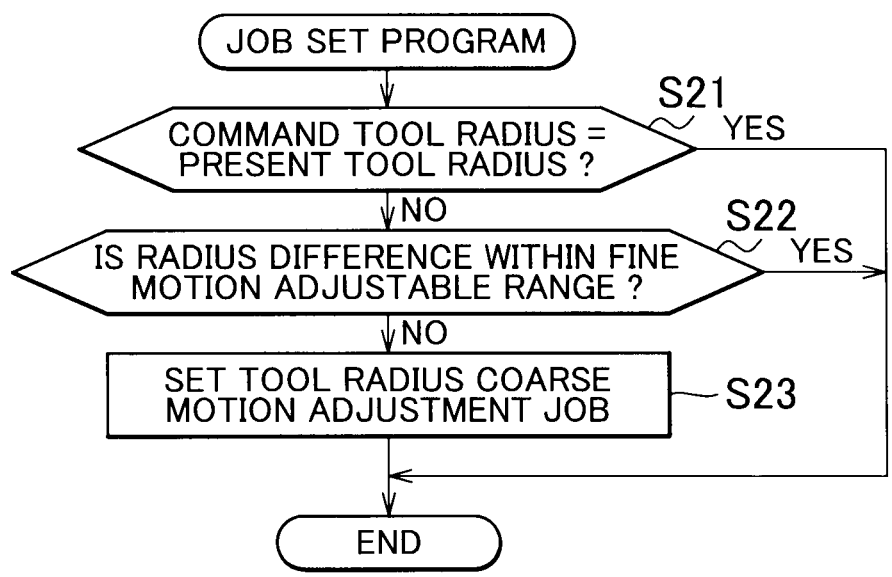
FIG. 19 is a flowchart showing a process of a job set program.

The process of the job set program executed by the main control unit of the machine tool will be described with reference to FIG. 19. It is determined whether the command tool radius for the tool, for which the job set program is executed, coincides with the tool radius (present tool radius) stored as the ID information on this tool (step S21). If the command tool radius coincides with the tool radius stored as the ID information, the process of the job set program ends.

On the other hand, when the command tool radius does not coincide with the tool radius stored as the ID information, it is determined whether the difference between the command tool radius and the present tool radius is within a range of differences that may be eliminated by the fine motion adjustment by the fine motion adjusting mechanism 20 (hereinafter, referred to as "fine motion adjustable range") (step S22). If the difference is within the fine motion adjustable range, the job set program ends. That is, when the command tool radius coincides with the present tool radius or when the difference between the command tool radius and the present tool radius is within the fine motion adjustable range, the tool radius adjusting device 107 needs not to make the coarse motion adjustment to the tool radius. Therefore, the job for making coarse motion adjustment to the tool radius (hereinafter, referred to as "tool radius coarse motion adjustment job) is not set. If it is determined in step S22 that the difference is not within the fine motion adjustable range, the tool radius coarse motion adjustment job is set, and then the job set program ends.

The process of the tool picking program executed by the main control unit of the machine tool will be described with reference to FIG. 20. The tool picking program is a process for moving the boring holder 1, which will be subjected to the tool radius coarse motion adjustment, to the tool radius adjusting device 107 using the carrier device 108. More specific description will be provided below. It is determined whether there is a tool radius coarse motion adjustment job that is set by the job set program (step S31). If there is no tool radius coarse motion adjustment job, the process returns to step S31. On the other hand, if there is a tool radius coarse motion adjustment job, it is determined whether the tool magazine 105 is being controlled by the tool changer 106 operation (step S32). The state where the tool magazine 105 is being controlled by the tool changer 106 operation includes the state where the tools are being changed by the tool changer 106 and the state where the next tool that will be subjected to a changeover has been called up and the tool magazine 105 is being operated. When the control is being executed by the tool changer 106 operation, the process returns to step S31.

When the control by the tool changer 106 operation is not being executed, it is determined whether the duration of time before the tools are changed by the tool changer 106 is equal to or longer than a predetermined duration of time (step S33). If the duration of time is shorter than the predetermined duration, the process returns to step S31. On the other hand, if the duration of time before the tools are changed is equal to or longer than the predetermined duration, it is determined whether it is possible to make coarse motion adjustment to the tool radius using the tool radius adjusting device 107 (step S34). That is, it is determined whether the tool radius adjusting device 107 is making coarse motion adjustment to the tool radius of another boring holder 1. If it is not possible to make the coarse motion adjustment to the tool radius using the tool radius adjusting device 107, the process returns to step S31.

On the other hand, if it is possible to make the coarse motion adjustment to the tool radius using the tool radius adjusting device 107, the process proceeds to the next step. That is, when the tool magazine 105 is not being controlled by the tool changer 106 opearation, the duration of time before the tools are changed is equal to or longer than the predetermined duration, and it is possible to make the coarse motion adjustment to the tool radius using the tool radius adjusting device 107, the pocket of the tool magazine 105, which stores the boring holder 1 that will be subjected to a switchover, is started to be moved to the tool radius adjustment index position P2 (step S35). Movement of the pocket of the tool magazine 105, which stores the said boring holder 1, to the tool radius adjustment index position P2 is executed with substantially no influence on the machining program.

Next, it is determined whether movement of the pocket of the tool magazine 105, which stores the said boring holder 1, to the tool radius adjustment index position P2 has been completed (step S36). If the movement has not been completed, the movement is continued until it is completed. Next, a command to pick the boring holder 1 out from the tool radius adjustment index position P2 of the tool magazine 105 is given to the carrier control unit 109 and the tool radius adjusting device 107 (step S37). Then, it is determined whether the boring holder 1 has been picked out from the tool magazine 105 by the carrier device 108 (step S38). If the boring holder 1 has been picked out from the tool magazine 105 (step S38), the process returns to step S31.

The process of the tool returning program executed by the main control unit of the machine tool will be described with reference to FIG. 21. The tool returning program is a program for returning the boring holder 1, of which the tool radius has been subjected to the coarse motion adjustment by the tool radius adjusting device 107, to the tool magazine 105 using the carrier device 108. More specifically, it is determined whether a command for calling up an empty pocket has been given to the tool magazine 105 by the carrier control unit 109 (step S41). If there is no command for calling up an empty pocket, the process returns to step S41. On the other hand, if there is a command to call up an empty pocket, it is determined whether the tool magazine 105 is being controlled by the tool changer 106 (step S42) operation. The state where the tool magazine 105 is being controlled by the tool changer 106 operation includes the state where the tools are being changed by the tool changer 106 and the state where the next tool that will be subjected to a changeover has been called up and the tool magazine 105 is being operated. When the control is being executed by the tool changer 106, the process returns to step S41.

On the other hand, if the control by the tool changer 106 operation is not being executed, it is determined whether the duration of time before the tools are changed by the tool changer 106 is equal to or longer than a predetermined duration of time (step S43). If the duration of time is shorter than the predetermined duration, the process returns to step S41. On the other hand, if the duration of time is equal to or longer than the predetermined duration, the empty pocket of the tool magazine 105 is started to be moved to the tool radius adjustment index position P2 (step S44). That is, movement of the empty pocket of the tool magazine 105 to the tool radius adjustment index position P2 is executed with substantially no influence on the machining program.

Next, it is determined whether the movement of the empty pocket of the tool magazine 105 to the tool radius adjustment index position P2 has been completed (step S45). If the movement has not been completed, the movement is continued until it is completed. Next, when the movement of the empty pocket to the tool radius adjustment index position P2 has been completed, a signal that indicates that the movement of the empty pocket has been completed is given to the carrier control unit 109 and the tool radius adjusting device 107 (step S46). Then, it is determined whether the boring holder 1, of which the tool radius has been adjusted, has been returned to the tool magazine 105 by the carrier device 108 (step S47). If the boring holder 1 has been returned to the tool magazine 105, the tool ID information on the boring holder 1 is updated (step S48). More specifically, the present tool radius is stored, and the amount of fine motion adjustment is stored. Then, the process returns to step S41.

Next, the process executed by the carrier control unit 109 and the process of the coarse motion adjustment to the tool radius executed by the tool radius adjusting device 107 will be described with reference to FIG. 22. In step S37 of the tool picking program, it is determined whether there is a command to pick the boring holder 1 out from the tool radius adjustment index position P2 of the tool magazine 105 (step S51). If there is no command, the process returns to step S51.

If there is a command to pick the boring holder 1 out from the tool magazine 105, the operation for picking the boring holder 1 out from the tool radius adjustment index position P2 of the tool magazine 105 is executed (step S52). That is, the operations from "No. 1" to "No. 5" shown in FIG. 13 to FIG. 16 are executed by the carrier device 108 in ascending order. Next, the operation for making coarse motion adjustment to the tool radius of the boring holder 1 is executed by the tool radius adjusting device 107 (step S53). Next, the tool radius of the boring holder 1, which has been subjected to the coarse motion adjustment by the tool radius adjusting device 107, is measured by the tool radius measuring device 240 (step S54).

Next, the fine motion adjustment amount that is the difference between the command tool radius and the measured tool radius of the boring holder 1 is calculated (step S55). Next, a command to call up an empty pocket to move the empty pocket to the tool radius index position P2 of the tool magazine 105 is given to the main control unit of the machine tool (step S56). Next, it is determined whether movement of the empty pocket of the tool magazine 105 to the tool radius adjustment index position P2 has been completed (step S57).

If the movement has not been completed, the movement is continued until it is completed. Whether the movement has been completed is determined by determining whether a signal indicating that the movement has been completed is output in step S46 of the tool returning program.

If the movement of the empty pocket to the tool radius adjustment index position P2 has been completed, the operation for returning the boring holder 1 to the tool radius adjustment index position P2 of the tool magazine 105 using the carrier device 108 is started (step S58). That is, the operations from "No. 5" to "No. 1" shown in FIG. 13 to FIG. 16 are executed by the carrier device 108 in descending order. Next, it is determined whether the operation for returning the boring holder 1 to the tool magazine 105 has been completed (step S59). If the operation has not been completed, the operation is continued until it is completed. Then, a signal indicating that the returning operation has been completed is output to the main control unit of the machine tool (step S60).

The machine tool described above produces the following effects. In the tool magazine 105, the tool radius adjustment index position P2 and the tool change index position P1 are set to different positions. In addition, the tool radius adjusting device 107 is able to make coarse motion adjustment to the tool radius of the boring holder 1 in parallel with execution of the machining program for executing the operation of the spindle head 102 and the operation of the tool changer 106. Further, the carrier control unit 109 determines whether the tool changing process is being executed by the tool changer 106. If the tool changing process is not being executed, the carrier control unit 109 allows the carrier device 108 to execute the operation for picking the boring holder 1 out from the tool magazine 105 and the operation for returning the boring holder 1, of which the tool radius has been adjusted, to the tool magazine 105. Thus, it is possible to execute the operation of the tool radius adjusting device 107 and the operation of the carrier device 108 without exerting influence on the process of the machining program. Accordingly, it is possible to restrict an increase in the machining cycle time even if the tool radius of the boring holder 1 is adjusted.

In addition, if the duration of time before execution of the tool changing process is started is equal to or longer than a predetermined duration of time, the operation by the carrier device 108 is executed. Accordingly, it is possible to suppress occurrence of the situation where the tools are changed by the tool changer 106 while the carrier device 108 is executing the operation for picking the boring holder 1 out from the tool magazine 105 or the operation for returning the boring holder 1 of which the tool radius has been adjusted to the tool magazine 105. That is, it is possible to execute the operation by the carrier device 108 without exerting influence on the operation for changing the tools executed by the tool changer 106. As a result, it is possible to restrain an increase in time for changing the tools, which may exert an influence on the machining cycle time.

What is claimed is:

1. A machine tool including a tool radius adjusting device, comprising:
a tool magazine which stores a plurality of tools including a boring holder having an adjustable tool radius, and in which a tool change index position and a tool radius adjustment index position that are obtained by indexing are set to different positions;
a spindle head to which one of the plurality of tools may be fitted at a given time;
a tool changer that makes a changeover between a tool stored at the tool change index position and a tool fitted to the spindle head;
a tool radius adjusting device that adjusts a tool radius of the boring holder brought out from the tool magazine, and that is able to execute an operation for adjusting the tool radius of the boring holder in parallel with execution of a machining program for executing an operation of the spindle head and an operation of the tool changer;
a carrier device that brings out the boring holder located at the tool radius adjustment index position from the tool magazine and carries the boring holder to the tool radius adjusting device, and that returns the boring holder of which the tool radius has been adjusted by the tool radius adjusting device from the tool radius adjusting device to the tool magazine; and
a carrier control unit that determines whether a tool changing process is being executed by the tool changer, and that allows the carrier device to execute an operation for bringing out the boring holder from the tool magazine and an operation for returning the boring holder of which the tool radius has been adjusted to the tool magazine when the tool changing process is not being executed.

2. The machine tool including a tool radius adjusting device according to claim 1, wherein the carrier control unit determines whether a duration of time before the tool changer starts executing the tool changing process is equal to or longer than a predetermined duration of time, and allows the carrier device to execute the operation for bringing out the boring holder from the tool magazine and the operation for returning the boring holder of which the tool radius has been adjusted to the tool magazine when the duration of time before the tool changer starts executing the tool changing process is equal to or longer than the predetermined duration of time.

3. The machine tool including a tool radius adjusting device according to claim 1, wherein:
the tool magazine stores the plurality of tools such that a tool axis direction of each stored tool coincides with a horizontal direction;
the tool radius adjusting device holds the boring holder such that a tool axis direction of the boring holder coincides with a vertical direction and a tool tip end of the boring holder faces upward, and adjusts the tool radius of the boring holder with the boring holder held such that the tool axis direction of the boring holder coincides with the vertical direction and the tool tip end of the boring holder faces upward; and
the carrier device carries the boring holder between the tool magazine and the tool radius adjusting device, and changes an orientation of the boring holder such that the tool axis direction of the boring holder is shifted from coinciding with the horizontal direction to coinciding with the vertical direction or from coinciding with the vertical direction to coinciding with the horizontal direction while carrying the boring holder.

4. The machine tool including a tool radius adjusting device according to claim 1, wherein:
the boring holder includes a coarse motion adjusting mechanism for adjusting the tool radius and a fine motion adjusting mechanism having an adjustment accuracy higher than an adjustment accuracy achieved by the coarse motion adjusting mechanism;
the tool radius adjusting device makes coarse motion adjustment to the tool radius using the coarse motion adjusting mechanism of the boring holder, and measures the tool radius of the boring holder achieved by the coarse motion adjustment to calculate a fine motion adjustment amount; and the fine motion adjusting mechanism makes a fine motion adjustment to the tool radius of the boring holder based on the fine motion adjustment amount calculated by the tool radius adjusting device, with the boring holder fitted to the spindle head.

* * * * *